US009830701B2

(12) United States Patent
Zhang et al.

(10) Patent No.: US 9,830,701 B2
(45) Date of Patent: Nov. 28, 2017

(54) STATIC OBJECT RECONSTRUCTION METHOD AND SYSTEM

(71) Applicant: Huawei Technologies Co., Ltd., Shenzhen (CN)

(72) Inventors: Guofeng Zhang, Hangzhou (CN); Hujun Bao, Hangzhou (CN); Kangkan Wang, Hangzhou (CN); Jiong Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/232,229

(22) Filed: Aug. 9, 2016

(65) Prior Publication Data

US 2016/0350904 A1 Dec. 1, 2016

Related U.S. Application Data

(63) Continuation of application No. PCT/CN2015/074074, filed on Mar. 12, 2015.

(30) Foreign Application Priority Data

Mar. 18, 2014 (CN) .......................... 2014 1 0101540

(51) Int. Cl.
*G06K 9/00* (2006.01)
*G06T 7/00* (2017.01)
(Continued)

(52) U.S. Cl.
CPC ............ *G06T 7/002* (2013.01); *G06K 9/6202* (2013.01); *G06T 7/337* (2017.01); *G06T 7/579* (2017.01);
(Continued)

(58) Field of Classification Search
CPC ....... G06T 7/002; G06T 7/003; G06T 7/0022; G06T 7/00; G06T 7/0075;
(Continued)

(56) References Cited

U.S. PATENT DOCUMENTS 7,446,798 B2 * 11/2008 Comaniciu .......... G06K 9/3241
348/143
8,587,583 B2 11/2013 Newcombe et al.
(Continued)

FOREIGN PATENT DOCUMENTS

CN 101877143 A 11/2010
CN 101908231 A 12/2010
(Continued)

OTHER PUBLICATIONS

Cui, Y., et al., "3D Shape Scanning with a Kinect," SIGGRAPH, Aug. 7-11, 2011, 1 page.
(Continued)

*Primary Examiner* — Amir Alavi
(74) *Attorney, Agent, or Firm* — Conley Rose, P.C.

(57) ABSTRACT

Embodiments of the present disclosure disclose a static object reconstruction method and system that are applied to the field of graph and image processing technologies. In the embodiments of the present disclosure, when a static object reconstruction system does not obtain, by means of calculation, an extrinsic camera parameter in a preset time when calculating the extrinsic camera parameter based on a three-dimensional feature point, it indicates that depth data collected by a depth camera is lost or damaged, and a two-dimensional feature point is used to calculate the extrinsic camera parameter to implement alignment of point clouds of a frame of image according to the extrinsic camera parameter. In this way, a two-dimensional feature point and a three-dimensional feature point are mixed, which can imple-
(Continued)

ment that a static object can also be successfully reconstructed when depth data collected by a depth camera is lost or damaged.

20 Claims, 12 Drawing Sheets

(51) Int. Cl.
G06T 17/00 (2006.01)
G06K 9/62 (2006.01)
G06T 7/80 (2017.01)
G06T 7/33 (2017.01)
G06T 7/73 (2017.01)
G06T 7/579 (2017.01)
G06T 7/593 (2017.01)

(52) U.S. Cl.
CPC ............... G06T 7/593 (2017.01); G06T 7/73 (2017.01); G06T 7/85 (2017.01); G06T 17/00 (2013.01); G06T 2207/10028 (2013.01); G06T 2207/20221 (2013.01); G06T 2207/30244 (2013.01)

(58) Field of Classification Search
CPC ... G06T 2207/0028; G06T 2207/20221; G06T 2207/10012; G06K 9/6202; H04N 13/0239; H04N 13/0082
See application file for complete search history.

(56) References Cited

U.S. PATENT DOCUMENTS

| | | | | |
|---|---|---|---|---|
| 2010/0245593 | A1* | 9/2010 | Kim | H04N 5/222 348/188 |
| 2011/0096832 | A1* | 4/2011 | Zhang | H04N 13/0022 375/240.08 |
| 2012/0243774 | A1 | 9/2012 | Chen et al. | |
| 2013/0095920 | A1* | 4/2013 | Patiejunas | G06F 15/00 463/31 |
| 2013/0100256 | A1* | 4/2013 | Kirk | G06T 7/0057 348/48 |
| 2015/0381968 | A1* | 12/2015 | Arora | G06T 17/00 348/47 |
| 2016/0350904 | A1* | 12/2016 | Zhang | G06T 17/00 |
| 2017/0200317 | A1* | 7/2017 | Hannemann | G06T 19/006 |

FOREIGN PATENT DOCUMENTS

| | | |
|---|---|---|
| CN | 102074015 A | 5/2011 |
| CN | 103456038 A | 12/2013 |

OTHER PUBLICATIONS

Harris, C., et al., "A Combined Corner and Edge Detector," AVC, 1988, pp. 147-152.
Nister, D.,et al., "An Efficient Solution to the Five-Point Relative Pose Problem," IEEE Transactions on Pattern Analysis and Machine Intelligence, vol. 26, No. 6, Jun. 2004, pp. 756-770.
Lourakis, M., et al., "SBA: A Software Package for Generic Sparse Bundle Adjustment," ACM Transactions on Mathematical Software, vol. 36, No. 1, Article 2, Mar. 2009, 30 pages.
Zhou, Q., et al., "Dense Scene Reconstruction with Points of Interest," Journal ACM Transactions on Graphics (TOG), vol. 32, No. 4, Jul. 2013, 8 pages.
Lowe, D., et al., "Distinctive Image Features from Scale-Invariant Keypoints," International Journal of Computer Vision, Jan. 5, 2004, 28 pages.
Rusu, R., et al., "Fast Point Feature Histograms (FPFH) for 3D Registration," IEEE International Conference on Robotics and Automation, May 12-17, 2009, pp. 3212-3217.
Newcombe, R., et al., "KinectFusion: Real-Time Dense Surface Mapping and Tracking," Oct. 1, 2011, 10 pages.
Cum, O., et al., "Locally Optimized RANSAC," 25th DAGM Symposium on Pattern Recognition, Sep. 10-12, 2003, 8 pages.
Snavely, N., et al., "Modeling the World from Internet Photo Collections," International Journal Computer Vision, Jan. 30, 2007, 22 pages.
<Azhdan, M., et al., "Poisson Surface Reconstruction," Europgraphics Symposium on Geometry Processing, 2006, 10 pages.
Fischler, M., et al., "Random Sample Consensus: A Paradigm for Model Fitting with Applications to Image Analysis and Automated Cartography," Graphics and Image Processing, vol. 24, No. 6, Jun. 1981, 15 pages.
Nießner, M., et al., "Real-time 3D Reconstruction at Scale using Voxel Hashing," Journal ACM Transactions on Graphics (TOG), Proceedings of ACM SIGGRAPH Asia, vol. 32, No. 6, Nov. 2013, 11 pages.
Weise, T., et al., "Realtime Performance-Based Facial Animation," Proceeding of SIGGRAPH, Aug. 7-11, 2011, 9 Pages.
Whelan, T., et al., "Robust Real-Time Visual Odometry for Dense RGB-D Mapping," IEEE International Conference on Robotics and Automation, May 6-10, 2013, 8 pages.
Tong, J., et al., "Scanning 3D Full Human Bodies Using Kinects," IEEE Transactions on Visualization and Computer Graphics, vol. 18, No. 4, Apr. 2012, pp. 643-650.
Zheng, M., et al., "Templateless Quasi-Rigid Shape Modeling with Implicit Loop-Closure," 2013, pp. 145-152.
Hu, G., et al., "A Robust RGB-D Slam Algorithm," IEEE/RSJ International Conference on Intelligent Robots and Systems, Oct. 7-12, 2012, pp. 1714-1719.
Berger, K., et al., "A State of the Art Report on Kinect Sensor Setups in Computer Vision," Time-of-Flight and Depth Imaging, LNCS 8200, 2013, pp. 257-272.
Henry, P., et al., "RGB-D mapping: Using Kinect-style depth cameras for dense 3D modeling of indoor environments," The International Journal of Robotics Research, Mar. 14, 2012, 17 pages.
Foreign Communication From a Counterpart Application, European Application No. 15764364.4, Extended European Search Report dated Jan. 5, 2017, 7 pages.
Foreign Communication From a Counterpart Application, PCT Application No. PCT/CN2015/074074, English Translation of International Search Report dated Jun. 19, 2015, 3 pages.
=Foreign Communication From a Counterpart Application, PCT Application No. PCT/CN2015/074074, English Translation of Written Opinion dated Jun. 19, 2015, 6 pages.

* cited by examiner $f_1$      $f_2$            $f_1$      $f_2$

STATIC OBJECT RECONSTRUCTION METHOD AND SYSTEM

CROSS-REFERENCE TO RELATED APPLICATIONS

This application is a continuation of International Application No. PCT/CN2015/074074, filed on Mar. 12, 2015, which claims priority to Chinese Patent Application No. 201410101540.9, filed on Mar. 18, 2014, both of which are hereby incorporated by reference in their entireties.

TECHNICAL FIELD

The present disclosure relates to the field of graph and image processing technologies, and in particular, to a static object reconstruction method and system.

BACKGROUND

Object reconstruction is widely applied to computer graphics and the computer vision field, for example, a special effect of a movie, a three-dimensional (3D) graph game, virtual reality, and human-computer interaction. Most reconstruction systems can reconstruct a detailed three-dimensional model. These reconstruction systems mainly use multiple synchronous cameras or three-dimensional scanning devices (for example, laser and structured light cameras) to collect object information, and then perform modeling. However, application of these reconstruction systems is greatly limited due to expensive devices and complex user interaction interfaces. Since Microsoft® launched a Kinect™ depth camera, because of characteristics such as cost effectiveness and easy to operate, a red green blue-dataset (RGB-D) camera derived from the Kinect™ depth camera has started to be widely applied to research related to object modeling.

The RGB-D camera collects two-dimensional image information and depth information of an object, and then a reconstruction system performs modeling according to a two-dimensional image information and the depth information. However, a loss of the depth information collected by the RGB-D camera causes static object reconstruction failure.

SUMMARY

A static object reconstruction method and system provided in embodiments of the present disclosure implement that static object reconstruction can be implemented when depth data collected by a depth camera is lost.

A first aspect of the embodiments of the present disclosure provides a static object reconstruction method, including obtaining a three-dimensional feature point and a two-dimensional feature point in a current frame of image of a static object, matching the three-dimensional feature point and reference feature points, and calculating an extrinsic camera parameter of the current frame of image, where the reference feature points are formed by accumulation of feature points in multiple frames of images of the static object, when the extrinsic camera parameter is not obtained in a preset time when the extrinsic camera parameter of the current frame of image is calculated based on the three-dimensional feature point, matching the two-dimensional feature point and a three-dimensional feature point in the reference feature points or matching the two-dimensional feature point and a two-dimensional feature point in a previous frame of image of the current frame of image of the static object, and calculating the extrinsic camera parameter of the current frame of image, and transforming, using the calculated extrinsic camera parameter, a point cloud of the current frame of image to a reference coordinate system that includes the reference feature points to model the static object.

In a first possible implementation manner of the first aspect of the embodiments of the present disclosure, the matching the three-dimensional feature point and reference feature points, and calculating an extrinsic camera parameter of the current frame of image includes selecting, from the reference feature points, multiple candidate corresponding points at a shortest distance from the three-dimensional feature point in the current frame of image, selecting candidate corresponding points separately corresponding to some three-dimensional feature points in all three-dimensional feature points in the current frame of image, calculating a model parameter according to the candidate corresponding points separately corresponding to the some three-dimensional feature points, performing scoring on a model corresponding to the calculated model parameter, cyclically executing the steps of selecting candidate corresponding points, calculating a model parameter, and performing scoring, and using a model parameter of a model with a highest score as the extrinsic camera parameter of the current frame of image, and when during the cycling, a probability that the selected some three-dimensional feature points and the selected candidate corresponding points are in an abnormal correspondence is less than a preset value for consecutive $K_a$ times, or a quantity of times of executing the cyclic steps exceeds a preset value, or a time for executing the cyclic steps exceeds a preset value, stopping executing the cyclic steps of selecting candidate corresponding points, calculating a model parameter, and performing scoring.

With reference to the first possible implementation manner of the first aspect of the embodiments of the present disclosure, in a second possible implementation manner of the first aspect of the embodiments of the present disclosure, the selecting candidate corresponding points separately corresponding to some three-dimensional feature points in all three-dimensional feature points in the current frame of image includes selecting the some three-dimensional feature points from all the three-dimensional feature points in the current frame of image according to a probability that feature points in space areas that are in the previous frame of image and that include the static object are in a correct correspondence with reference feature points, and selecting, from the multiple candidate corresponding points, a candidate corresponding point of the three-dimensional feature point according to a probability of selecting a candidate corresponding point of the feature point in the previous frame of image.

With reference to the first or the second possible implementation manner of the first aspect of the embodiments of the present disclosure, in a third possible implementation manner of the first aspect of the embodiments of the present disclosure, before the matching the three-dimensional feature point and reference feature points, and calculating an extrinsic camera parameter of the current frame of image, the method further includes matching the three-dimensional feature point and the feature points in the previous frame of image of the current frame of image of the static object, to obtain an initial extrinsic camera parameter, and the matching the three-dimensional feature point and reference feature points, and calculating an extrinsic camera parameter of the current frame of image includes using the initial extrinsic camera parameter as a condition of determining the extrinsic camera parameter according to a model score, and matching the three-dimensional feature point and the reference feature points of the static object, to finally obtain the extrinsic camera parameter of the current frame of image.

With reference to the first aspect of the embodiments of the present disclosure or any one of the first to the third possible implementation manners of the first aspect, in a fourth possible implementation manner of the first aspect of the embodiments of the present disclosure, the matching the two-dimensional feature point and a three-dimensional feature point in the reference feature points, and calculating the extrinsic camera parameter of the current frame of image includes matching the two-dimensional feature point and the three-dimensional feature point in the reference feature points, to determine a three-dimensional reference feature point corresponding to the two-dimensional feature point, determining an extrinsic camera parameter that minimizes a camera pose function in the reference coordinate system, where the camera pose function includes a correspondence between the two-dimensional feature point and the three-dimensional reference feature point, and using the determined extrinsic camera parameter as the extrinsic camera parameter of the current frame of image.

With reference to the first aspect of the embodiments of the present disclosure or any one of the first to the third possible implementation manners of the first aspect, in a fifth possible implementation manner of the first aspect of the embodiments of the present disclosure, the matching the two-dimensional feature point and a two-dimensional feature point in a previous frame of image of the current frame of image of the static object, and calculating the extrinsic camera parameter of the current frame of image includes matching the two-dimensional feature point and the two-dimensional feature point in the previous frame of image of the current frame of image of the static object, to determine the two-dimensional feature point that is in the previous frame of image and is corresponding to the two-dimensional feature point, selecting multiple pairs of corresponding feature points that have depth data at both the two-dimensional feature point in the current frame of image and the two-dimensional feature point that is in the previous frame of image and is corresponding to the two-dimensional feature point, determining an extrinsic camera parameter, relative to the previous frame of image, of the current frame of image according to depth change information of the selected multiple pairs of corresponding feature points, and determining the extrinsic camera parameter of the current frame of image according to the relative extrinsic camera parameter and an extrinsic camera parameter of the previous frame of image.

With reference to the first aspect of the embodiments of the present disclosure or any one of the first to the fifth possible implementation manners of the first aspect, in a sixth possible implementation manner of the first aspect of the embodiments of the present disclosure, when the extrinsic camera parameter is not obtained in the preset time when the extrinsic camera parameter of the current frame of image is calculated based on the three-dimensional feature point, the method further includes generating, according to collected two-dimensional data of the multiple frames of images of the static object, a source model that includes depth data, transforming the source model to a target model using a transformation matrix, and completing lost depth data in the current frame of image according to the transformed target model, where the target model includes depth data in the current frame of image of the static object, the transformation matrix is a matrix that minimizes a first energy function, the first energy function includes a distance item and a smoothness item, the distance item is used to indicate a distance between a vertex in the source model and a corresponding vertex in the target model, and the smoothness item is used to restrict transformation of adjacent vertices.

With reference to the first aspect of the embodiments of the present disclosure or any one of the first to the sixth possible implementation manners of the first aspect, in a seventh possible implementation manner of the first aspect of the embodiments of the present disclosure, after the calculating the extrinsic camera parameter of the current frame of image, the method further includes establishing a correspondence between the three-dimensional feature point in the current frame of image and the reference feature points using the extrinsic camera parameter, adjusting extrinsic camera parameters of N frames of images of the static object to minimize a second energy function, where the second energy function includes a distance between a three-dimensional feature point in the $i^{th}$ frame of image and a feature point that is transformed from a corresponding reference feature point and is in a coordinate system of the $i^{th}$ frame of image, and i is a positive integer ranging from 0 to N, and the transforming, using the calculated extrinsic camera parameter, a point cloud of the current frame of image to a reference coordinate system that includes the reference feature points includes transforming the point cloud of the current frame of image to the reference coordinate system using an extrinsic camera parameter obtained after the adjustment is performed on the calculated extrinsic camera parameter.

With reference to the seventh possible implementation manner of the first aspect of the embodiments of the present disclosure, in an eighth possible implementation manner of the first aspect of the embodiments of the present disclosure, when the extrinsic camera parameter is calculated based on the two-dimensional feature point, after the calculating the extrinsic camera parameter of the current frame of image, the method further includes establishing a correspondence between the two-dimensional feature point in the current frame of image and the reference feature points using the extrinsic camera parameter, where the second energy function further includes a distance between a two-dimensional feature point in the $i^{th}$ frame of image and a feature point that is transformed from a corresponding reference feature point and that is in the coordinate system of the $i^{th}$ frame of image.

With reference to the first aspect of the embodiments of the present disclosure or any one of the first to the sixth possible implementation manners of the first aspect, in a ninth possible implementation manner of the first aspect of the embodiments of the present disclosure, after the calculating the extrinsic camera parameter of the current frame of image, the method further includes when a feature point in a frame of image of the static object overlaps a feature point in another frame of image, combining the feature points that overlap in the frame of image and the another frame of image, and obtaining updated reference feature points, updating an extrinsic camera parameter of each frame of image of the static object according to the updated reference feature points, and the transforming, using the calculated extrinsic camera parameter, a point cloud of the current frame of image to a reference coordinate system that includes the reference feature points includes transforming the point cloud of the current frame of image to the reference coordinate system using an extrinsic camera parameter obtained after the updating is performed on the calculated extrinsic camera parameter.

A second aspect of the embodiments of the present disclosure provides a static object reconstruction system, including a feature obtaining unit configured to obtain a three-dimensional feature point and a two-dimensional feature point in a current frame of image of a static object, a first extrinsic parameter calculation unit configured to match the three-dimensional feature point obtained by the feature obtaining unit and reference feature points, and calculate an extrinsic camera parameter of the current frame of image, where the reference feature points are formed by accumulation of feature points in multiple frames of images of the static object, a second extrinsic parameter calculation unit configured to when the first extrinsic parameter calculation unit does not obtain, by means of calculation, the extrinsic camera parameter in a preset time when calculating the extrinsic camera parameter of the current frame of image based on the three-dimensional feature point, match the two-dimensional feature point obtained by the feature obtaining unit and a three-dimensional feature point in the reference feature points or match the two-dimensional feature point obtained by the feature obtaining unit and a two-dimensional feature point in a previous frame of image of the current frame of image of the static object, and calculate the extrinsic camera parameter of the current frame of image, and a transformation unit configured to transform, using the extrinsic camera parameter calculated by the first extrinsic parameter calculation unit or the second extrinsic parameter calculation unit, a point cloud of the current frame of image to a reference coordinate system that includes the reference feature points to model the static object.

In a first possible implementation manner of the second aspect of the present disclosure, the first extrinsic parameter calculation unit includes a candidate selection unit configured to select, from the reference feature points, multiple candidate corresponding points at a shortest distance from the three-dimensional feature point in the current frame of image, a selection unit configured to select candidate corresponding points separately corresponding to some three-dimensional feature points in all three-dimensional feature points in the current frame of image, a model calculation unit configured to calculate a model parameter according to the candidate corresponding points selected by the selection unit that are separately corresponding to the some three-dimensional feature points, a scoring unit configured to perform scoring on a model corresponding to the model parameter calculated by the model calculation unit, and an extrinsic parameter determining unit configured to use, as the extrinsic camera parameter of the current frame of image, a model parameter of a model with a highest score among scores obtained after the selection unit, the model calculation unit, and the scoring unit cyclically execute the steps of selecting candidate corresponding points, calculating a model parameter, and performing scoring, where the extrinsic parameter determining unit is further configured to when during the cycling, a probability that the selected some three-dimensional feature points and the selected candidate corresponding points are in an abnormal correspondence is less than a preset value for consecutive $K_a$ times, or a quantity of times of executing the cyclic steps exceeds a preset value, or a time for executing the cyclic steps exceeds a preset value, instruct the selection unit, the model calculation unit, and the scoring unit to stop executing the cyclic steps of selecting candidate corresponding points, calculating a model parameter, and performing scoring.

With reference to the first possible implementation manner of the second aspect of the embodiments of the present disclosure, in a second possible implementation manner of the second aspect of the embodiments of the present disclosure, the selection unit is configured to select the some three-dimensional feature points from all the three-dimensional feature points in the current frame of image according to a probability that feature points in space areas that are in the previous frame of image and that include the static object are in a correct correspondence with reference feature points, and select, from the multiple candidate corresponding points, a candidate corresponding point of the three-dimensional feature point according to a probability of selecting a candidate corresponding point of the feature point in the previous frame of image.

With reference to the first or the second possible implementation manner of the second aspect of the embodiments of the present disclosure, in a third possible implementation manner of the second aspect of the embodiments of the present disclosure, the first extrinsic parameter calculation unit is further configured to match the three-dimensional feature point and the feature points in the previous frame of image of the current frame of image of the static object, to obtain an initial extrinsic camera parameter, use the initial extrinsic camera parameter as a condition of determining the extrinsic camera parameter according to a model score, and match the three-dimensional feature point and the reference feature points of the static object, to finally obtain the extrinsic camera parameter of the current frame of image.

With reference to the second aspect of the embodiments of the present disclosure or any one of the first to the third possible implementation manners of the second aspect, in a fourth possible implementation manner of the second aspect of the embodiments of the present disclosure, the second extrinsic parameter calculation unit includes a feature matching unit configured to match the two-dimensional feature point and the three-dimensional feature point in the reference feature points, to determine a three-dimensional reference feature point corresponding to the two-dimensional feature point, and an extrinsic parameter obtaining unit configured to determine an extrinsic camera parameter that minimizes a camera pose function in the reference coordinate system, where the camera pose function includes a correspondence between the two-dimensional feature point and the three-dimensional reference feature point, and use the determined extrinsic camera parameter as the extrinsic camera parameter of the current frame of image.

With reference to the fourth possible implementation manner of the second aspect of the embodiments of the present disclosure, in a fifth possible implementation manner of the second aspect of the embodiments of the present disclosure, the second extrinsic parameter calculation unit further includes a correspondence selection unit, the feature matching unit is further configured to match the two-dimensional feature point and the two-dimensional feature point in the previous frame of image of the current frame of image of the static object, to determine the two-dimensional feature point that is in the previous frame of image and is corresponding to the two-dimensional feature point, the correspondence selection unit is configured to select multiple pairs of corresponding feature points that have depth data at both the two-dimensional feature point in the current frame of image and the feature point that is in the previous frame of image and is corresponding to the two-dimensional feature point, and the extrinsic parameter obtaining unit is further configured to determine an extrinsic camera parameter, relative to the previous frame of image, of the current frame of image according to depth change information of the multiple pairs of corresponding feature points selected by the correspondence selection unit, and determine the extrinsic camera parameter of the current frame of image according to the relative extrinsic camera parameter and an extrinsic camera parameter of the previous frame of image.

With reference to the second aspect of the embodiments of the present disclosure or any one of the first to the fifth possible implementation manners of the second aspect, in a sixth possible implementation manner of the second aspect of the embodiments of the present disclosure, the system further includes a model generation unit configured to when determining that calculating the extrinsic camera parameter of the current frame of image based on the three-dimensional feature point fails, generate, according to collected two-dimensional data of the multiple frames of images of the static object, a source model that includes depth data, where the target model includes depth data in the current frame of image of the static object, the transformation matrix is a matrix that minimizes a first energy function, the first energy function includes a distance item and a smoothness item, the distance item is used to indicate a distance between a vertex in the source model and a corresponding vertex in the target model, and the smoothness item is used to restrict transformation of adjacent vertices, a model transformation unit configured to transform, to the target model using the transformation matrix, the source model generated by the model generation unit, and a completion unit configured to complete lost depth data in the current frame of image according to the target model obtained after the model transformation unit performs the transformation.

With reference to the second aspect of the embodiments of the present disclosure or any one of the first to the sixth possible implementation manners of the second aspect, in a seventh possible implementation manner of the second aspect of the embodiments of the present disclosure, the system further includes a correspondence establishment unit configured to establish a correspondence between the three-dimensional feature point in the current frame of image and the reference feature points using the extrinsic camera parameter, and an adjustment unit configured to adjust extrinsic camera parameters of N frames of images of the static object to minimize a second energy function, where the second energy function includes a distance between a three-dimensional feature point in the $i^{th}$ frame of image and a feature point that is transformed from a corresponding reference feature point and is in a coordinate system of the $i^{th}$ frame of image, and i is a positive integer ranging from 0 to N, where the transformation unit is configured to transform the point cloud of the current frame of image to the reference coordinate system using an extrinsic camera parameter that is of the current frame of image and is obtained by the adjustment unit by means of adjustment.

With reference to the seventh possible implementation manner of the second aspect of the embodiments of the present disclosure, in an eighth possible implementation manner of the second aspect of the embodiments of the present disclosure, the correspondence establishment unit is further configured to, when the extrinsic camera parameter is calculated based on the two-dimensional feature point, establish a correspondence between the two-dimensional feature point in the current frame of image and the reference feature points using the extrinsic camera parameter, and the second energy function that the adjustment unit uses when adjusting the extrinsic camera parameter further includes a distance between a two-dimensional feature point in the $i^{th}$ frame of image and a feature point that is transformed from a corresponding reference feature point and that is in the coordinate system of the $i^{th}$ frame of image.

With reference to the second aspect of the embodiments of the present disclosure or any one of the first to the sixth possible implementation manners of the second aspect, in a ninth possible implementation manner of the second aspect of the embodiments of the present disclosure, the system further includes a combination unit configured to, when a feature point in a frame of image of the static object overlaps a feature point in another frame of image, combine the feature points that overlap in the frame of image and the another frame of image, and an updating unit configured to obtain updated reference feature points according to the feature points combined by the combination unit, and update an extrinsic camera parameter of each frame of image of the static object according to the updated reference feature points, where the transformation unit is configured to transform the point cloud of the current frame of image to the reference coordinate system using an extrinsic camera parameter that is of the current frame of image and is obtained by the updating unit by means of updating.

In the embodiments of the present disclosure, when a static object reconstruction system does not obtain an extrinsic camera parameter in a preset time when calculating the extrinsic camera parameter based on a three-dimensional feature point, it indicates that depth data collected by a depth camera is lost or damaged, and a two-dimensional feature point is used to calculate the extrinsic camera parameter to implement alignment of point clouds of a frame of image according to the extrinsic camera parameter. In this way, a two-dimensional feature point and a three-dimensional feature point are mixed, which can implement that a static object can also be successfully reconstructed when depth data collected by a depth camera is lost or damaged.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

In the specification, claims, and accompanying drawings of the present disclosure, the terms "first", "second", "third", "fourth", and the like (if existent) are intended to distinguish between similar objects but do not necessarily indicate an order or sequence. It should be understood that the data termed in such a way are interchangeable in proper circumstances so that the embodiments of the present disclosure described herein can be implemented in orders except the order illustrated or described herein. Moreover, the terms "include," "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

In addition, many feature points are involved in the following document. When it is not specified whether the feature point is a three-dimensional feature point or a two-dimensional feature point, the feature point may include the three-dimensional feature point and/or the two-dimensional feature point, and a type of the feature point varies according to a processing method.

Figure 1:
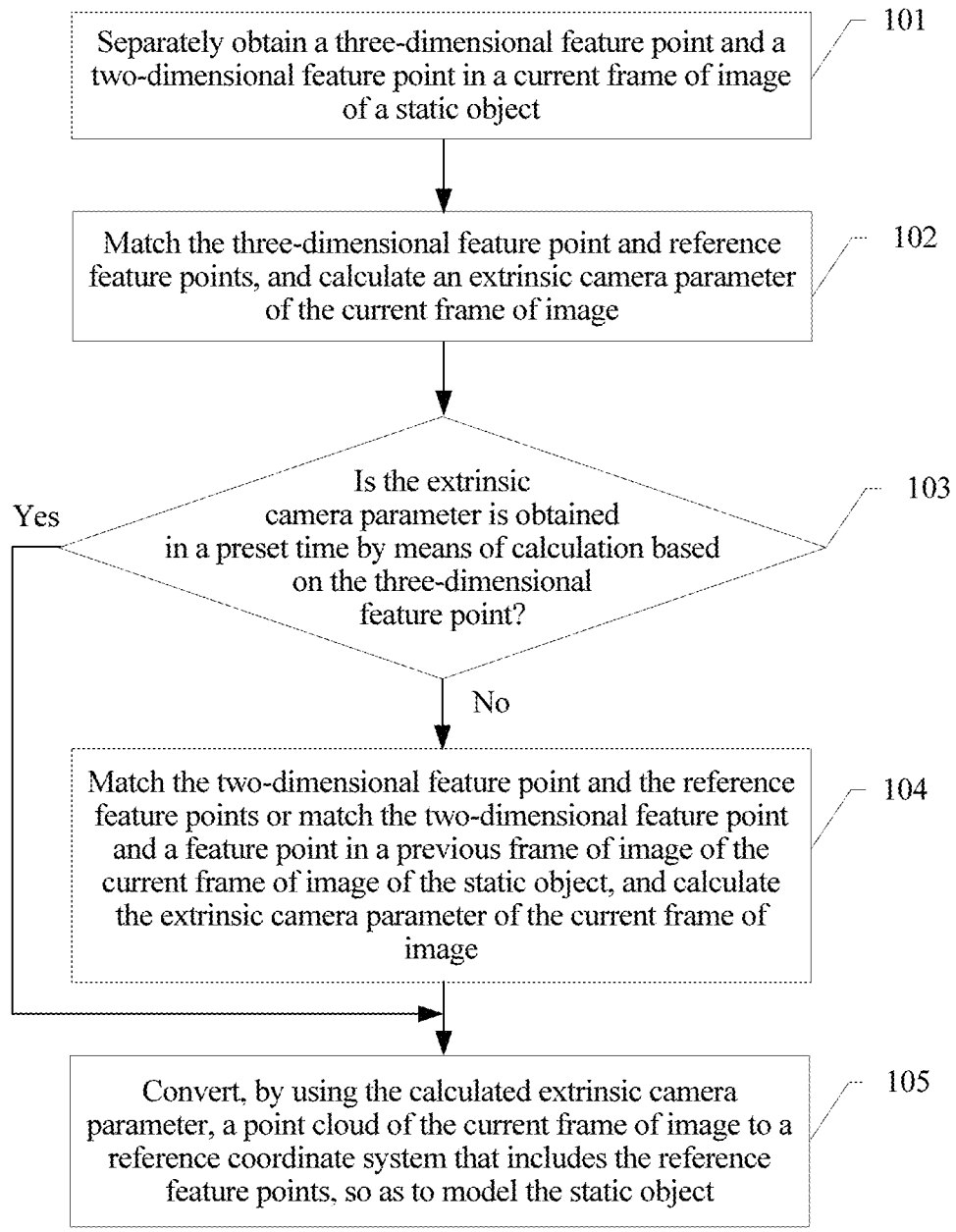
FIG. 1 is a flowchart of a static object reconstruction method according to an embodiment of the present disclosure.

An embodiment of the present disclosure provides a static object reconstruction method. In the method in the embodiment of the present disclosure, a depth camera such as an RGB-D camera is mainly used to photograph a static object in various directions to obtain multiple frames of images, for example, photograph the static object in various directions around the static object, where each frame of image is an image that is of the static object and that is obtained by photographing by the depth camera in a direction, and data of a frame of image may include two-dimensional information such as a color, and may further include three-dimensional information such as depth data, and then the static object is modeled using a static object reconstruction system and according to the foregoing multiple frames of images obtained by photographing by the depth camera. The method in the embodiment of the present disclosure is a method executed by a static object reconstruction system, a method flowchart is shown in FIG. 1, and the method includes the following steps:

Step 101. Obtain a three-dimensional feature point and a two-dimensional feature point in a current frame of image of a static object.

It may be understood that, the static object reconstruction system obtains multiple frames of images obtained by photographing by a depth camera, and performs, according to steps 101 to 105, processing on data of each frame of image obtained by photographing by the depth camera. For a frame of image (e.g. the current frame of image), the static object reconstruction system needs to first perform feature extraction on the current frame of image. Because data of a frame of image obtained by photographing by the depth camera includes two-dimensional information and three-dimensional information, in this embodiment, a feature point that has three-dimensional information, i.e. a three-dimensional feature point, and a feature point that has only two-dimensional information, i.e. a two-dimensional feature point need to be extracted.

When feature points are being obtained, a two-dimensional feature point may be extracted using a surface texture of the static object, for example, the two-dimensional feature point in the current frame of image is extracted using a scale-invariant feature transform (SIFT) method. However, some static objects have a few surface textures, and only a few traditional feature points can be extracted. To extract more and stable features, in this embodiment, when extracting a three-dimensional feature point, the static object reconstruction system uses, as a three-dimensional feature point, a corner point extracted using geometric information or using a texture and geometric information, for example, extracts the three-dimensional feature point using a fast point feature histograms (FPFH) method. To facilitate subsequent calculation, each two-dimensional feature point and each three-dimensional feature point extracted above both need to correspond to one feature description quantity. A feature description quantity of the two-dimensional feature point may include information such as color information and two-dimensional coordinates, and a feature description quantity of the three-dimensional feature point may include information such as depth data and three-dimensional coordinates, and may further include some color information and the like. The corner point is a point with representativeness and robustness (which means that the point can be stably located even in the case of noise interference) in an image, for example, a partial bright or dark point, an endpoint of a line segment, or a point that has a maximum curvature value in a curve.

In this embodiment of the present disclosure, the feature description quantity of the three-dimensional feature point may be obtained by the static object reconstruction system by splicing a two-dimensional feature description quantity and a three-dimensional feature description quantity of the three-dimensional feature point into one set using a feature description quantity splicing method. First, the static object reconstruction system separately standardizes the two-dimensional feature description quantity and the three-dimensional feature description quantity, i.e., separately calculates standard deviations of the two-dimensional feature description quantity and the three-dimensional feature description quantity in a training set of the two-dimensional feature description quantity and the three-dimensional feature description quantity, and divides a feature description quantity by a corresponding standard deviation to obtain a standardized feature description quantity. Then the static object reconstruction system combines a standardized two-dimensional feature description quantity and a standardized three-dimensional feature description quantity to obtain the feature description quantity of the three-dimensional feature point. For example, $f=(\alpha f_{2D}, \beta f_{3D})$, where $f_{2D}$ is the standardized two-dimensional feature description quantity, $f_{3D}$ is the standardized three-dimensional feature description quantity, and $\alpha$ and $\beta$ are respectively coefficients of the two-dimensional feature description quantity and the three-dimensional feature description quantity and are used to adjust impact of the two parts on the entire feature description quantity.

Step 102. Match the three-dimensional feature point and reference feature points, and calculate an extrinsic camera parameter of the current frame of image, where the reference feature points are formed by accumulation of feature points in multiple frames of images of the static object, the extrinsic camera parameter refers to parameter information such as a location and an orientation of a depth camera in three-dimensional space when the depth camera obtains the current frame of image by photographing, and each frame of image is corresponding to one extrinsic camera parameter.

Matching the three-dimensional feature point and the reference feature points is mainly comparing respective feature description quantities of the three-dimensional feature point and the reference feature points to find reference feature points separately corresponding to all three-dimensional feature points in the current frame of image. The three-dimensional feature points in the current frame of image are aligned with a reference feature coordinate system that includes the reference feature points, and then the extrinsic camera parameter may be calculated using the found corresponding reference feature points. When no corresponding reference feature point is found for a three-dimensional feature point, the three-dimensional feature point is added to the reference feature points. For any three-dimensional feature point, Euclidean distances between the three-dimensional feature point and all the reference feature points may be separately calculated, and a reference feature point at a shortest Euclidean distance from the three-dimensional feature point is used as a reference feature point corresponding to the three-dimensional feature point.

Step 103. Determine whether in the foregoing step 102, the extrinsic camera parameter is obtained in a preset time when the extrinsic camera parameter of the current frame of image is calculated based on the three-dimensional feature point, where when the extrinsic camera parameter is obtained, step 105 is executed using the extrinsic camera parameter calculated in the foregoing step 102, or when the extrinsic camera parameter is not obtained, step 104 is executed, and step 105 is executed using an extrinsic camera parameter calculated based on the two-dimensional feature point.

When the extrinsic camera parameter is not calculated in the preset time using the foregoing step 102, it is considered that calculating the extrinsic camera parameter based on the three-dimensional feature point fails. However, there are many reasons causing a failure in calculating the extrinsic camera parameter, in this embodiment, it is considered that a part or all of depth data in the current frame of image obtained by photographing by the depth camera is lost or damaged, and step 104 needs to be executed, i.e., the extrinsic camera parameter is calculated using the two-dimensional feature point.

Step 104. Match the two-dimensional feature point and a three-dimensional feature point in the reference feature points or match the two-dimensional feature point and a two-dimensional feature point in a previous frame of image of the current frame of image of the static object, and calculate the extrinsic camera parameter of the current frame of image.

Because a feature description quantity of the three-dimensional feature point includes a two-dimensional feature description quantity, the static object reconstruction system can align the two-dimensional feature point in the current frame of image with the three-dimensional feature point in the reference feature points, and then calculate the extrinsic camera parameter according to a found corresponding three-dimensional feature point in the reference feature points. In another embodiment, the static object reconstruction system may align the two-dimensional feature point in the current frame of image with the two-dimensional feature point in the previous frame of image, and then calculate the extrinsic camera parameter. A relative extrinsic camera parameter is obtained according to corresponding two-dimensional feature points in the current frame of image and the previous frame of image, and then the extrinsic camera parameter of the current frame of image can be obtained with reference to a previously calculated extrinsic camera parameter of the previous frame of image.

Step 105. Transform, using the calculated extrinsic camera parameter, a point cloud of the current frame of image to a reference coordinate system that includes the reference feature points to model the static object, where the point cloud of the current frame of image refers to a set of a vast quantity of points in a same spatial coordinate system that express target space distribution and a target surface feature, and the foregoing two-dimensional feature point and the foregoing three-dimensional feature point are only some points in the point cloud.

It may be learned that, in this embodiment of the present disclosure, when a static object reconstruction system does not obtain an extrinsic camera parameter in a preset time when calculating the extrinsic camera parameter based on a three-dimensional feature point, it indicates that depth data collected by a depth camera is lost or damaged, and a two-dimensional feature point is used to calculate the extrinsic camera parameter to implement alignment of point clouds of a frame of image according to the extrinsic camera parameter. In this way, a two-dimensional feature point and a three-dimensional feature point are mixed, which can implement that a static object can also be successfully reconstructed when depth data collected by a depth camera is lost or damaged.

Figure 2:
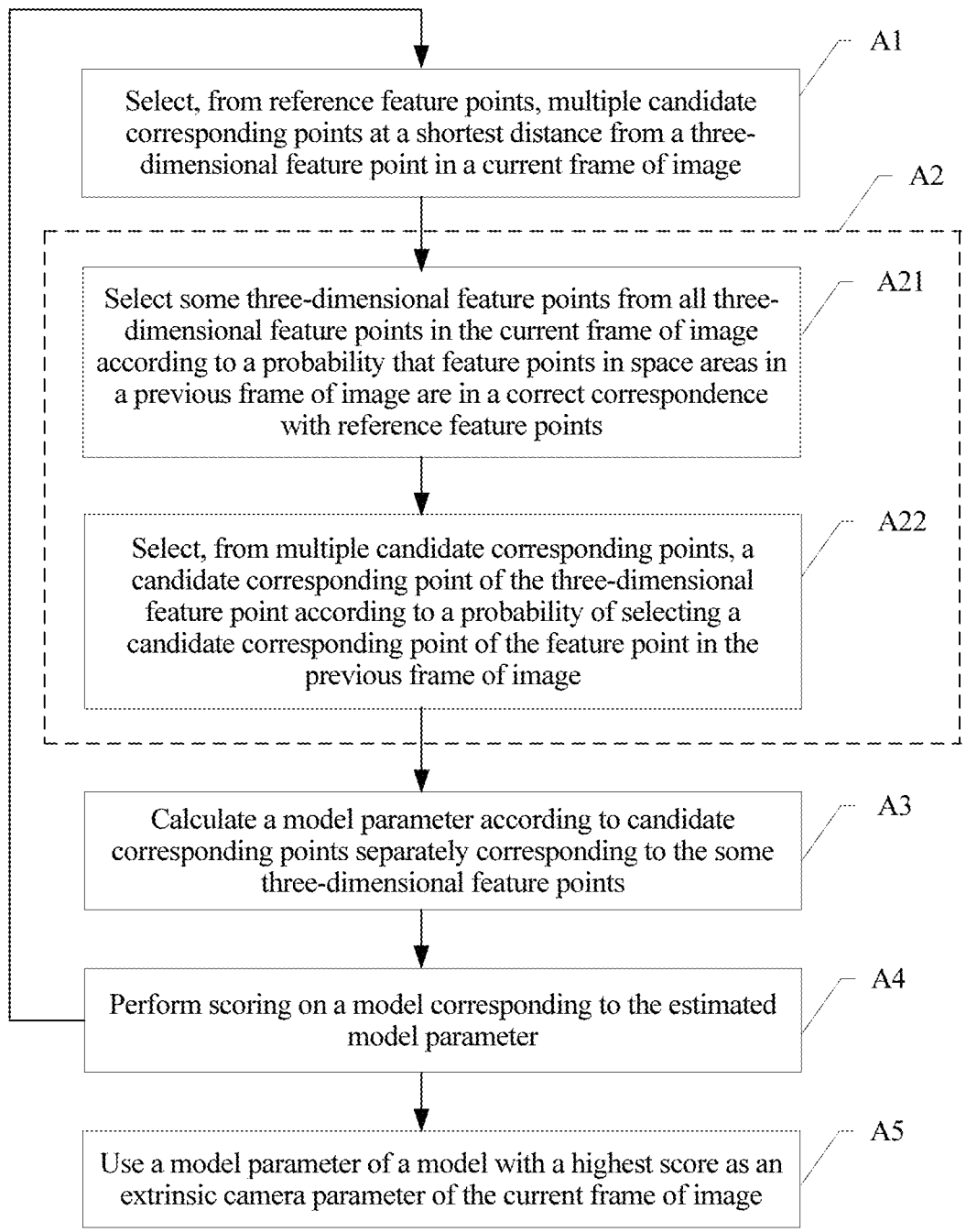
FIG. 2 is a flowchart of a method for calculating an extrinsic camera parameter based on a three-dimensional feature point according to an embodiment of the present disclosure.

Referring to FIG. 2, in an embodiment, when executing the foregoing step 102 of calculating the extrinsic camera parameter of the current frame of image based on the three-dimensional feature point, the static object reconstruction system may implement step 102 using the following steps.

A1. Select, from the reference feature points, multiple candidate corresponding points at a shortest distance from the three-dimensional feature point in the current frame of image.

In an embodiment, the static object reconstruction system uses a nearest neighbor feature matching method to match feature points. When one reference feature point corresponding to the three-dimensional feature point is determined in the reference feature points directly according to a related algorithm, an incorrect corresponding reference feature point may be found. Therefore, to improve a correct correspondence probability, in this embodiment of the present disclosure, multiple candidate corresponding points may be first found for each three-dimensional feature point, and then further calculation is performed. For a three-dimensional feature point in the current frame of image, Euclidean distances between the three-dimensional feature point and all the reference feature points are calculated, these Euclidean distances are sorted, and multiple reference feature points at a relatively short Euclidean distance from the three-dimensional feature point are selected as candidate corresponding points.

Figure 3A:
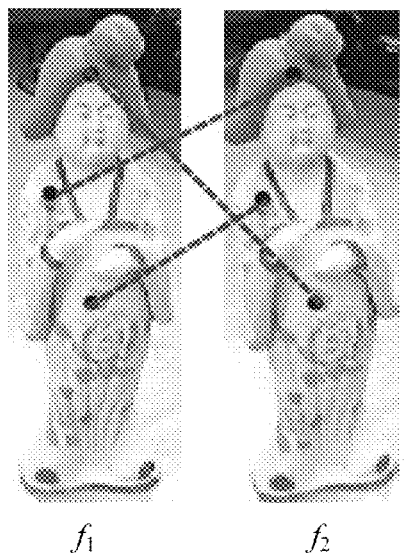
FIG. 3A and FIG. 3B are schematic diagrams of a comparison between selecting one corresponding point from reference feature points and selecting multiple candidate corresponding points from the reference feature points according to an embodiment of the present disclosure.
Figure 3B:
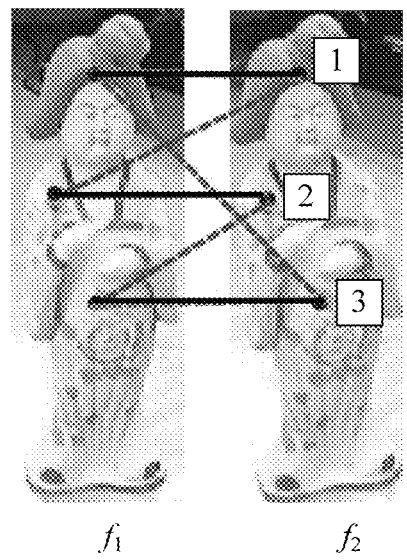

As shown in FIG. 3A, an incorrect corresponding feature point for a feature point in an f1 frame of image may be found in an f2 frame of image, where an incorrect correspondence is indicated by a dotted line in FIG. 3A. For example, a feature point on a head in the f1 frame of image is corresponding to a feature point on a belly in the f2 frame of image, and consequently, f1 and f2 cannot be correctly aligned. Further, as shown in FIG. 3B, when multiple nearest neighbor candidate corresponding points for each feature point in the f1 frame of image are found in the f2 frame of image, for example, for the feature point on the head in the f1 frame of image, when candidate corresponding points 1, 2, and 3 are found in the f2 frame of image, a correct correspondence (indicated by a solid line) is included in the candidate corresponding points.

A2. Select candidate corresponding points separately corresponding to some three-dimensional feature points in all the three-dimensional feature points in the current frame of image.

To calculate the extrinsic camera parameter of the current frame, a feature point correctly corresponding to the three-dimensional feature point in the current frame of image may be selected from the multiple candidate corresponding points corresponding to the three-dimensional feature point that are selected in the foregoing step A1, and the extrinsic camera parameter is calculated. In implementation, the extrinsic camera parameter may be obtained using a model parameter calculation method such as random sample consensus (RANSAC). However, because in this embodiment, each three-dimensional feature point is corresponding to multiple candidate corresponding points, and the common RANSAC method is complex and time-consuming in calculation, a prior-based multi-candidates RANSAC (PMC-SAC) method is proposed. Random selection for the current frame of image is guided using probability distribution of matching between the previous frame of image and the reference feature points mainly because data of the current frame of image is similar to that of the previous frame of image. The method may be implemented using steps A2 to A4, and step A2 may be further implemented using the following steps.

A21. Select the some three-dimensional feature points from all the three-dimensional feature points in the current frame of image according to a probability that feature points in space areas that are in the previous frame of image and that include the foregoing static object are in a correct correspondence with reference feature points, where a quantity of selected three-dimensional feature points is mainly determined according to a subsequent model parameter calculation method.

A22. Select, from the multiple candidate corresponding points obtained in the foregoing step A1, a candidate corresponding point of the three-dimensional feature point in the current frame of image according to a probability of selecting a candidate corresponding point corresponding to the feature point in the previous frame of image.

Assuming that space including the static object is divided into 30*30*30 grids (grid), the static object reconstruction system records, for each grid, a correct correspondence probability in the case of matching the feature points in the previous frame of frame and the reference feature points, where one grid is one space area.

For example, when there are n feature points in a grid $G_i$, and a correct corresponding reference feature point in the reference feature points can be found for x feature points, a correct correspondence probability of $G_i$ is $$\varepsilon_i^* = \frac{x}{n}.$$

Correct correspondence probabilities of all the grids are normalized to obtain a probability of selecting a correct corresponding feature point for $$G_i: p_i = \varepsilon_i^* \Big/ \sum_j \varepsilon_j^*.$$

When the probability is relatively high, it indicates that a correct correspondence probability of a space area, i.e, $G_i$, in the previous frame of image is relatively high, correspondingly, a correct correspondence probability of the space area in the current frame of image is also relatively high, and some three-dimensional feature points may be selected from the space area in the current frame of image.

Further, it is assumed that each feature point in the previous frame of image has b candidate corresponding points, a probability of selecting the $k^{th}$ candidate corresponding point is defined as $$q_k = 1 - \frac{d}{d+\delta}$$

according to a spatial distance d between the feature point and the candidate corresponding point, and $$q_k^* = \frac{q_k}{\sum_{j=1}^{b} q_j}$$

is obtained after normalization, where δ is an adjustment parameter that controls impact of the spatial distance d on the probability. When the probability is relatively high, it indicates that a probability that the feature point in the previous frame of image and the $k^{th}$ candidate corresponding point are in a correct correspondence is relatively high, correspondingly, a probability that the three-dimensional feature point in the current frame of image and the $k^{th}$ candidate corresponding point are in a correct correspondence is also relatively high, and one candidate corresponding point may be selected from the vicinity of the $k^{th}$ candidate corresponding point in the multiple candidate corresponding points obtained in the foregoing step A2.

A3. Calculate a model parameter according to the selected candidate corresponding points separately corresponding to the some three-dimensional feature points in the foregoing step A2.

A4. Perform scoring on a model corresponding to the model parameter calculated in step A3.

A score s of a model corresponding to a model parameter may be described using a covariance matrix C, i.e., $$s = \frac{4\pi\sqrt{\det(C)}}{3A},$$

where A is a volume, used for standardization, of an entire grid, $$\frac{4}{3}\pi\sqrt{\det(C)}$$

indicates a volume of an ellipsoid on which correct corresponding feature points (i.e., three-dimensional feature points for which correct corresponding reference feature points can be found in the reference feature points) are distributed, and the covariance matrix C may be:

$$C = \frac{1}{N-1}\sum_i (f_i - \bar{f})(f_i - \bar{f})^T,$$

where N is a quantity of correct corresponding feature points, $f_i$ is a spatial location of the $i^{th}$ correct corresponding feature point, and $$\bar{f} = \frac{1}{N}\sum_i f_i$$

is an average location of all correct corresponding feature points. When the score is relatively high, it indicates that in the model, a quantity of three-dimensional feature points for which correct corresponding reference feature points can be found in the reference feature points is relatively large, and these three-dimensional feature points can be evenly distributed in entire space of the current frame of image.

A5. Cyclically execute the foregoing steps A2 to A4, i.e., cyclically execute the foregoing steps of selecting candidate corresponding points, calculating a model parameter, and performing scoring, and use a model parameter of a model with a highest score as the extrinsic camera parameter of the current frame of image. In this process, the static object reconstruction system needs to set an initial value for the extrinsic camera parameter, and use the initial value as a condition of determining the extrinsic camera parameter according to a model score, in this case, when the extrinsic camera parameter of the current frame of image is determined, a score of a model corresponding to the finally determined extrinsic camera parameter needs to be higher than a score of a model corresponding to the initial value of the extrinsic camera parameter.

When the model parameter is calculated above, the model parameter is obtained using the candidate corresponding points corresponding to the some (for example, three) three-dimensional feature points. Therefore, when the model with the highest score is obtained, the static object reconstruction system may further first transform all the three-dimensional feature points in the current frame of image to the reference coordinate system using the model parameter of the model, obtain corresponding reference feature points by means of calculation, recalculate a model parameter according to all three-dimensional feature points for which correct corresponding feature points can be found in the reference feature points, and then use the recalculated model parameter as a final extrinsic camera parameter. When the model parameter is calculated, when in the three-dimensional feature points and the reference feature points, a quantity of correct corresponding points is larger, a model parameter that is finally obtained by means of calculation is more accurate, and the foregoing finally obtained extrinsic camera parameter is also more accurate.

It may be learned that in this embodiment, the static object reconstruction system may repeatedly execute the foregoing steps A2 to A4 to select candidate corresponding points separately corresponding to three-dimensional feature points in the current frame of image that are selected in different times, further obtain different model parameters to perform scoring, and use a model parameter of a model with a highest score as the extrinsic camera parameter of the current frame of image. To avoid calculation complexity caused by an excessive quantity of times of cycling, in this case, the static object reconstruction system may set a condition of stopping cyclically executing the foregoing steps A2 to A4, for example, the foregoing cyclic procedure is terminated when during the foregoing cycling, a probability that the selected some three-dimensional feature points and the selected separately corresponding candidate corresponding points are in an abnormal correspondence is less than a preset value $\eta$ for consecutive $K_a$ times, i.e., $$\left(1 - \left(\sum_i p_i \hat{\epsilon}_i / b\right)^m\right)^{K_a} < \eta,$$

where $\hat{\epsilon}_i$ is a correct correspondence probability of a grid $G_i$ in the current frame of image, b is a quantity of candidate corresponding points corresponding to one three-dimensional feature point, $\Sigma_i p_i \hat{\epsilon}_i / b$ is a probability that one candidate corresponding point selected from the multiple candidate corresponding points is correctly corresponding to the three-dimensional feature point in the current frame of image, $(\Sigma_i p_i \hat{\epsilon}_i / b)^m$ is a probability that multiple three-dimensional feature points selected at a time are all correctly corresponding to reference feature points, and m is a quantity of multiple three-dimensional feature points.

For another example, when a quantity of times of executing the foregoing cyclic steps exceeds a preset value, or a time for executing the foregoing cyclic steps exceeds a preset value, cycling of the foregoing steps A2 to A4, i.e., the cyclic steps of selecting candidate corresponding points, calculating a model parameter, and performing scoring is stopped.

It should be noted that, the static object reconstruction system may obtain the extrinsic camera parameter of the current frame of image directly according to the foregoing steps A1 to A5. In another embodiment, the static object reconstruction system may first calculate an initial extrinsic camera parameter, and then optimize the extrinsic camera parameter using the foregoing steps A1 to A5.

The static object reconstruction system first matches the three-dimensional feature point and the feature points in the previous frame of image of the current frame of image of the static object, to obtain the initial extrinsic camera parameter. A method is similar to the method in the foregoing steps A1 to A5, but differs in that the static object reconstruction system needs to select, from the feature points in the previous frame of image, multiple candidate corresponding points at a shortest distance from the three-dimensional feature point in the current frame of image, and then performs other processing. Then the static object reconstruction system uses the initial extrinsic camera parameter as a condition of determining the extrinsic camera parameter according to a model score, and matches the three-dimensional feature point and the reference feature points of the static object according to the method in the foregoing steps A1 to A5, to finally obtain the extrinsic camera parameter of the current frame of image. When the static object reconstruction system executes the foregoing step A5, a score of a model corresponding to the finally determined extrinsic camera parameter needs to be higher than a score of a model corresponding to the initial extrinsic camera parameter.

Figure 4:
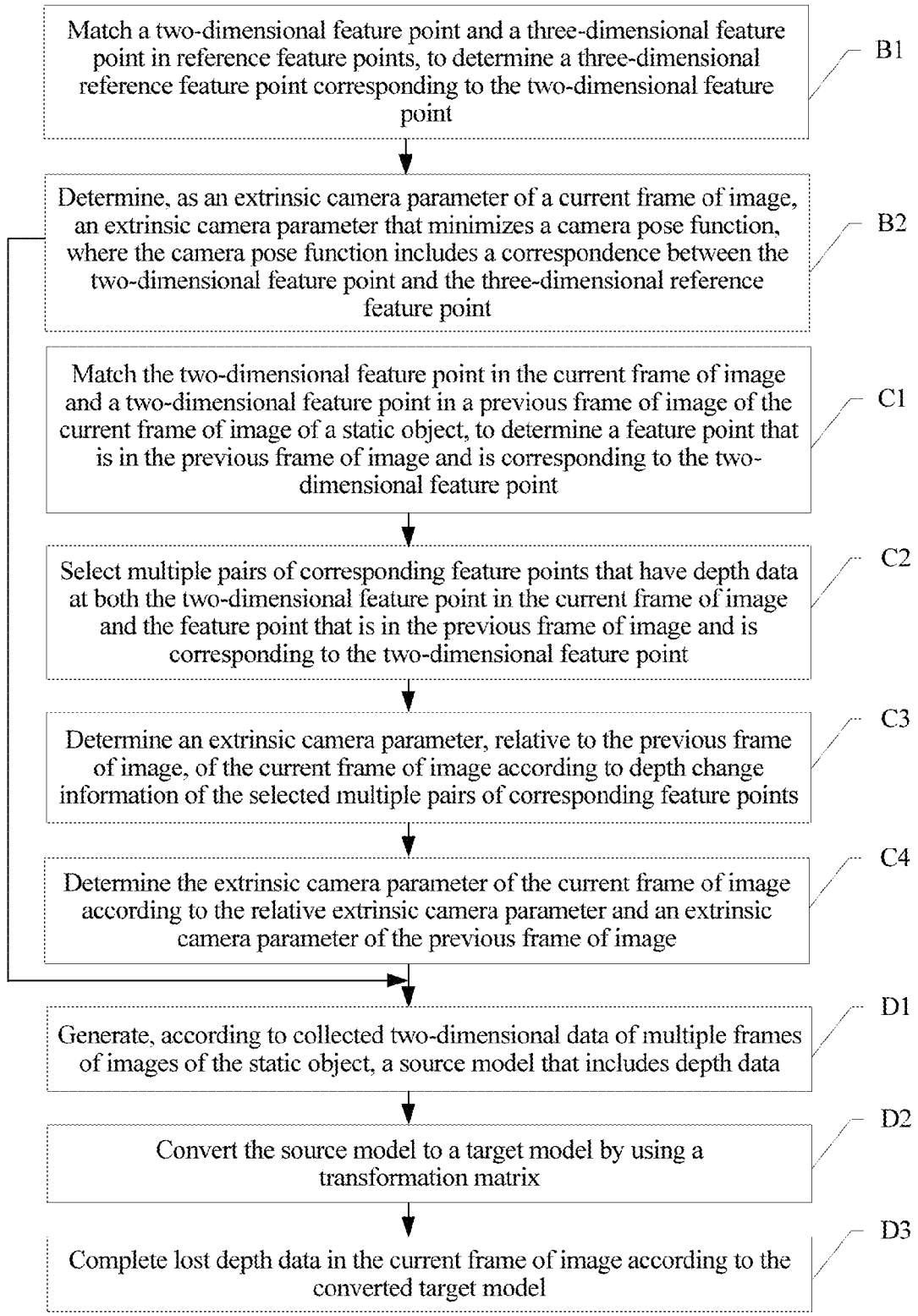
FIG. 4 is a flowchart of a method for calculating an extrinsic camera parameter based on a two-dimensional feature point and completing depth data according to an embodiment of the present disclosure.

Referring to FIG. 4, in another embodiment, when executing the foregoing step 104, the static object reconstruction system may implement step 104 in the following manners:

(1) Camera Pose Calculation Method Based on Two-Dimensional to Three-Dimensional (2D-3D) Matching Points.

B1. Match the two-dimensional feature point in the current frame of image and the three-dimensional feature point in the reference feature points, to determine the three-dimensional reference feature point corresponding to the two-dimensional feature point. Because the feature description quantity of the three-dimensional feature point includes the two-dimensional feature description quantity, matching may be performed between a two-dimensional description quantity of the two-dimensional feature point and the two-dimensional description quantity of the three-dimensional feature point in the reference feature points.

B2. Determine an extrinsic camera parameter that minimizes a camera pose function in the reference coordinate system, where the camera pose function includes a correspondence between the two-dimensional feature point and the three-dimensional reference feature point, and use the determined extrinsic camera parameter as the extrinsic camera parameter of the current frame of image.

The camera pose function may be $$E(R, t) = \sum_i \|K(RX_i + t) - x_i\|^2,$$

where $(x_i, X_i)$ is the correspondence between the two-dimensional feature point and the three-dimensional reference feature point, K is an intrinsic parameter matrix, R is a camera rotation matrix, and t is a camera displacement vector, where R and t herein may be equivalent to extrinsic camera parameters. Minimizing the function is determining values of R and t to minimize a value of the function.

(2) Camera Pose Calculation Method Based on 2D-2D Matching Points.

C1. Match the two-dimensional feature point in the current frame of image and the two-dimensional feature point in the previous frame of image of the current frame of image of the static object, to determine the two-dimensional feature point that is in the previous frame of image and is corresponding to the two-dimensional feature point.

C2. Select multiple pairs of corresponding feature points that have depth data at both the two-dimensional feature point in the current frame of image and the two-dimensional feature point that is in the previous frame of image and is corresponding to the two-dimensional feature point.

C3. Determine an extrinsic camera parameter, relative to the previous frame of image, of the current frame of image according to depth change information of the selected multiple pairs of corresponding feature points. The relative extrinsic camera parameter may be obtained by calculating a scaling ratio of a length of a displacement vector between corresponding feature points in the two frames of images according to a depth change ratio, where the depth change information of the multiple pairs of corresponding feature points is obtained according to depth data of the multiple pairs of corresponding feature points.

C4. Determine the extrinsic camera parameter of the current frame of image according to the relative extrinsic camera parameter and an extrinsic camera parameter of the previous frame of image.

It may be learned that in this embodiment, the relative extrinsic camera parameter is obtained using a five-point method in the foregoing steps C2 and C3, and then the extrinsic camera parameter of the current frame of image may be obtained according to the known extrinsic camera parameter of the previous frame of image. In the five-point method, relative transformation of two frames may be calculated by establishing five correct two-dimensional corresponding points in the two frames.

(3) Hybrid Calculation Method.

In this method, the foregoing two methods are combined. After extrinsic camera parameters of the current frame of image are obtained using the foregoing two methods, the three-dimensional feature point in the current frame of image may be first transformed to the reference coordinate system (a coordinate system that includes the reference feature points) by separately using the two extrinsic camera parameters. Then a probability that a corresponding reference feature point for the three-dimensional feature point in the current frame of image can be found in the reference feature points is calculated, where when a distance between a feature point that is transformed from the three-dimensional feature point and is in the reference coordinate system and a nearest reference feature point is less than a preset value, it is considered that the corresponding reference feature point can be found in the reference feature points. Then an extrinsic camera parameter corresponding to a relatively high probability is used as a final extrinsic camera parameter of the current frame of image.

It should be noted that, in an embodiment, when the extrinsic camera parameter is not obtained in the preset time by means of calculation when the extrinsic camera parameter is calculated based on the three-dimensional feature point, it indicates that depth data that is of an image and collected by the depth camera may be lost, and the extrinsic camera parameter needs to be calculated based on the two-dimensional feature point, i.e. the foregoing step 104 is executed. In addition, further, to reconstruct a complete model of the static object, the static object reconstruction system further needs to perform geometric completion, which is mixing depth data in all frames of images, completing a lost part in each frame of image using a ray tracing technology, and then recovering depth data in each frame of image using an image sequence to further complete lost depth data, which is implemented using the following steps.

D1. Generate, according to collected two-dimensional data of the multiple frames of images of the static object, a source model that includes depth data.

D2. Transform the source model to a target model using a transformation function, where the target model includes depth data in the current frame of image of the static object, the transformation function is a function that minimizes a first energy function, and the first energy function includes a distance item and a smoothness item.

One transformation $X_i$ is allocated to each vertex in the source model, a vertex in the source model is transformed to a corresponding vertex in the target model, and transformations of all the vertices are integrated to obtain a 4n*3 matrix, i.e. a transformation matrix $X_t=[X_1 \ldots X_n]^T$, where n is a quantity of vertices in the source model.

(1) The distance item in the first energy function is used to indicate a distance between a vertex in the source model and a corresponding vertex in the target model.

It is assumed that fixed corresponding points in the source model and the target model are $(v_i, u_i)$ and a sparse matrix D is defined as:

$$D := \begin{bmatrix} v_1^T & & & \\ & v_2^T & & \\ & & \ddots & \\ & & & v_n^T \end{bmatrix},$$

where the transformation matrix X is transformed to a transformed vertex using D, $v_i$ is indicated by coordinates $v_i=[x, y, z, 1]^T$, and vertices in the target model and corresponding vertices in the source model are arranged as a matrix $U:=[u_1, \ldots, u_n]$. The distance item is indicated by a Frobenius norm as:

$E_d(X)=\|W(DX-U)\|_F^2$, where W is a weight matrix and is indicated as $\text{diag}(w_1, \ldots, w_n)$, and for a lost vertex (i.e. lost depth data in the current frame of image) in the target model, a corresponding weight $w_i$ is set to 0.

(2) The smoothness item in the first energy function is used to restrict transformation of adjacent vertices.

To make separate transformation of adjacent vertices from the source model to the target model similar, and avoid a sudden change, transformation smoothness may be ensured using the smoothness item, which may be defined as:

$$E_s(X) = \sum_{i,j \in \varepsilon} \|(X_i - X_j)G\|_F^2,$$

where $G:=\text{diag}(1, 1, 1, \gamma)$, $\gamma$ is used to balance a rotation part and a displacement part of transformation, an edge set $\varepsilon$ of the model is obtained using adjacent pixels, and there is an edge between vertices corresponding to the adjacent pixels.

Indexes are numbered for all edges and vertices in the source model, and an edge points to a vertex with a relatively high index from a vertex with a relatively low index. When an edge r connects vertices (i, j), non-zero items in the $r^{th}$ row in a point-arc matrix M are $M_{ri}=-1$ and $M_{rj}=1$. The smoothness item may be indicated in the following matrix form:

$E_s(X)=\|(M \otimes G)X\|_F^2$, where $\otimes$ is Kronecker multiplication.

The first energy function may be obtained with reference to the foregoing distance item and smoothness item:

$E(X):=E_d(X)+\alpha E_s(X)$, where $\alpha$ is a smoothness item weight. The first energy function may also be written as:

$$E(X) = \left\| \begin{bmatrix} \alpha M \otimes G \\ WD \end{bmatrix} X - \begin{bmatrix} 0 \\ WU \end{bmatrix} \right\|_F^2$$
$$= \|AX - B\|_F^2.$$

The transformation matrix may be obtained by minimizing the first energy function. In this embodiment, to keep a geometric shape of the source model, and enable the source model to be transformed to the target model in a partial and detailed manner, the smoothness item weight in the foregoing first energy function gradually decreases in the transformation process. At a beginning stage of transformation, a relatively large weight value is used for restriction such that the source model can be wholly transformed to the target model. More partial transformation is completed by continually reducing the weight value. Due to restriction of the smoothness item, a vertex in the source model is not directly moved to a corresponding vertex in the target model, but is moved to a target surface in a parallel manner, and the vertex in the source model has no corresponding vertex, and is smoothly transformed due to restriction from an adjacent vertex. When a change of X is less than a threshold, transformation is terminated.

D3. Complete lost depth data in the current frame of image according to the transformed target model.

Figure 5:
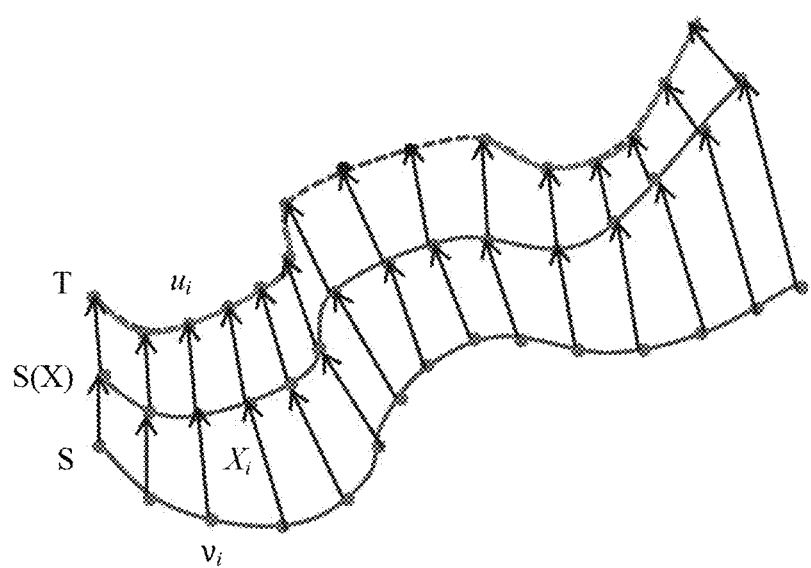
FIG. 5 is a schematic diagram of depth data completion according to an embodiment of the present disclosure.

When completing the lost depth data, the static object reconstruction system completes the lost depth data according to the target model obtained by means of transformation. For example, referring to FIG. 5, each vertex $v_i$ in a source model S is gradually transformed to a corresponding vertex $u_i$ in a target model T using a transformation matrix $X_i$, and adjacent vertices in a same model have similar transformation to ensure transformation smoothness. A smoothness restriction weight gradually decreases in the transformation process to keep an entire shape of the source model and complete partial transformation. Transformation is continually repeated until a stable state is reached. A lost part in the source model is completed using vertices (i.e. points connected by a dotted line in FIG. 5) that are of a model and are obtained after corresponding transformation of the source model, and completed vertices are completed depth data.

It should be noted that, the step of calculating the extrinsic camera parameter based on the two-dimensional feature point in the foregoing step 104 and the step of geometric completion in the foregoing steps D1 to D3 have no absolute order relationship, and may be executed simultaneously, or may be executed in order. The foregoing steps shown in FIG. 4 are only one implementation manner thereof.

In another embodiment, after calculating an extrinsic camera parameter of each frame of image, the static object reconstruction system may optimize the extrinsic camera parameter in the following manners.

(1) After the extrinsic camera parameter is calculated based on the three-dimensional feature point, the extrinsic camera parameter is optimized in a bundle adjustment manner, i.e., extrinsic camera parameters of N frames of images are optimized, where the N frames of images are consecutive N frames of images.

Figure 6:
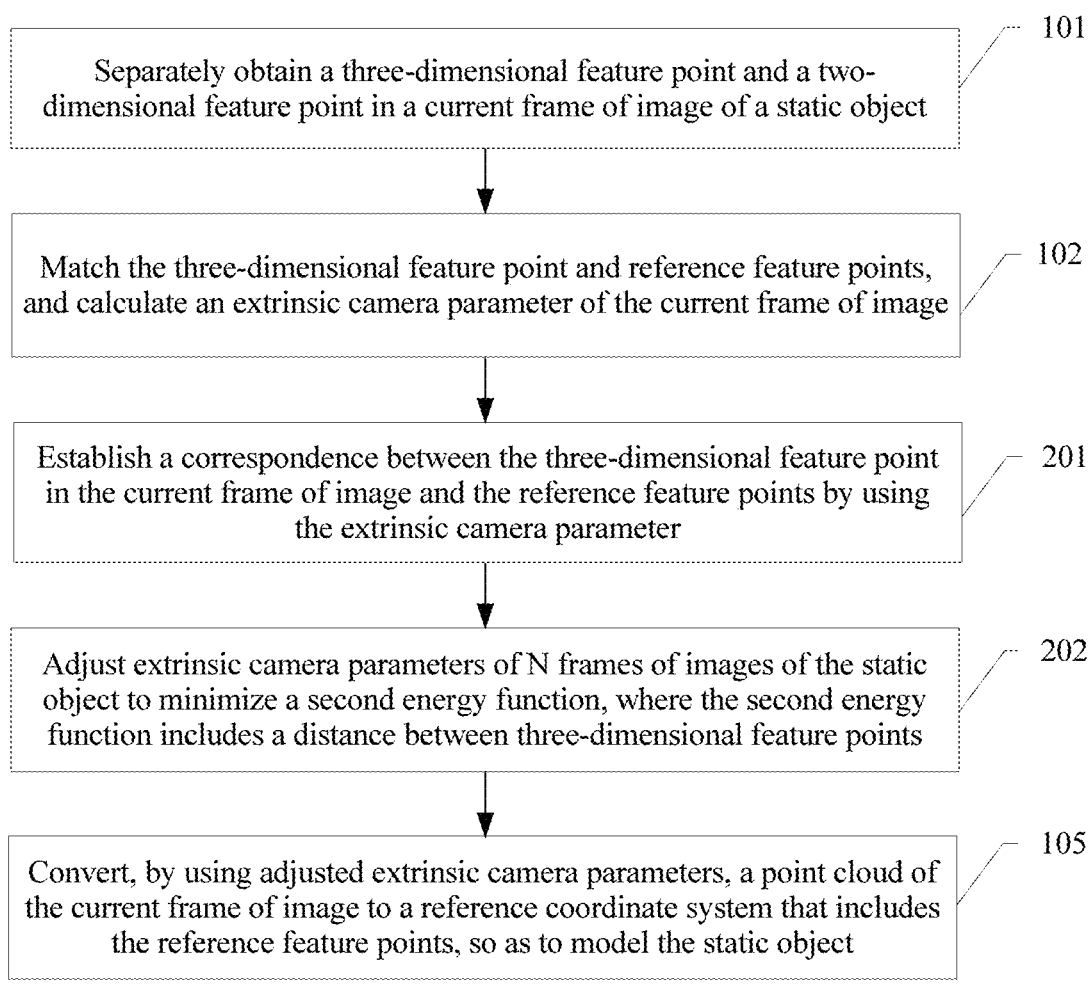
FIG. 6 is a flowchart of another static object reconstruction method according to an embodiment of the present disclosure.

Referring to FIG. 6, after executing the foregoing steps 101 and 102 on each frame of image in the N frames of images (for example, 30 frames of images), the static object reconstruction system further executes the following step 201 before performing adjustment in step 202. When executing the foregoing step 105, the static object reconstruction system transforms the point cloud of the current frame of image to the reference coordinate system mainly using an extrinsic camera parameter that is of the current frame of image and is obtained after adjustment is performed on the calculated extrinsic camera parameter, which is as follows:

Step 201. Establish a correspondence between the three-dimensional feature point in the current frame of image and the reference feature points using the extrinsic camera parameter.

The three-dimensional feature point in the current frame of image may be first transformed to the reference coordinate system using the extrinsic camera parameter, then spatial distances between a transformed feature point and all the reference feature points are calculated, and a shortest spatial distance is found. When the shortest spatial distance is less than a preset value such as 6 millimeters (mm), a correspondence between a reference feature point corresponding to the shortest spatial distance and a corresponding three-dimensional feature point is established.

Step 202. Adjust extrinsic camera parameters of N frames of images of the static object to minimize a second energy function, and in a process of minimizing the second energy function, further adjust a location of a reference feature point corresponding to each feature point in the N frames of images. In this way, each feature point in each frame of image is aligned with a corresponding reference feature point to minimize distances between all corresponding points, thereby implementing that an alignment error scatters in an entire optimization sequence. The second energy function includes a distance between a three-dimensional feature point in the $i^{th}$ frame of image and a feature point that is transformed from a corresponding reference feature point and is in a coordinate system of the $i^{th}$ frame of image, where i is a positive integer ranging from 0 to N.

The second energy function may be:

$$\min_{T_i, g_j} \sum_{i=1}^{N} \sum_{k=1}^{m_i} d(Q(T_i, g_j), P_{ik})^2,$$

where $P_{ik}$ is the $k^{th}$ three-dimensional feature point in the $i^{th}$ frame of image, $g_j(j \in [1, \ldots, L])$ is a reference feature point corresponding to $P_{ik}$, $Q(T_i, g_j)$ is a three-dimensional feature point transformed from a reference feature point $g_j$ in the reference coordinate system to the coordinate system of the $i^{th}$ frame of image by means of $T_i$, $T_i$ is rigid transformation by means of which depth data in the $i^{th}$ frame of image is transformed from the reference coordinate system to the coordinate system of the $i^{th}$ frame of image, and d(x, y) indicates a Euclidean distance.

(2) After the extrinsic camera parameter is calculated based on the two-dimensional feature point, the extrinsic camera parameter is optimized in a bundle adjustment manner, i.e., extrinsic camera parameters of N frames of images are optimized.

Figure 7:
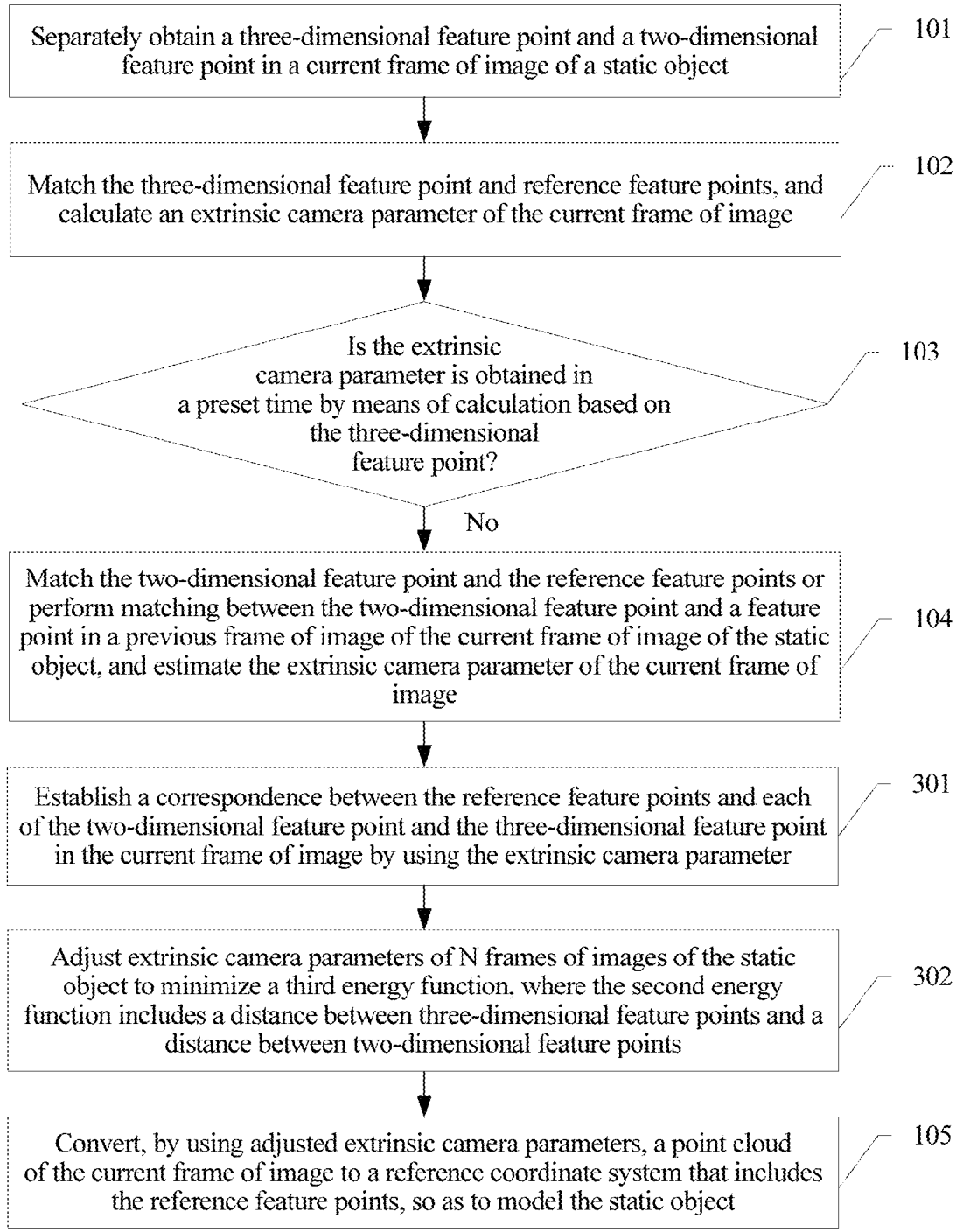
FIG. 7 is a flowchart of another static object reconstruction method according to an embodiment of the present disclosure.

Referring to FIG. 7, after executing the foregoing steps 101 to 104 on each frame of image in the N frames of images, the static object reconstruction system further executes the following step 301 before performing adjustment in step 302. When executing the foregoing step 105, the static object reconstruction system transforms the point cloud of the current frame of image to the reference coordinate system mainly using an extrinsic camera parameter that is of the current frame of image and is obtained after adjustment is performed on the calculated extrinsic camera parameter, which is as follows.

Step 301. Establish a correspondence between the reference feature points and each of the two-dimensional feature point and the three-dimensional feature point in the current frame of image using the extrinsic camera parameter.

Step 302. Adjust extrinsic camera parameters of N frames of images of the static object to minimize a second energy function, and further adjust a location of a reference feature point corresponding to each feature point in the N frames of images, where the second energy function includes a distance between a three-dimensional feature point in the $i^{th}$ frame of image and a feature point that is transformed from a corresponding reference feature point and is in a coordinate system of the $i^{th}$ frame of image, and a distance between a two-dimensional feature point in the $i^{th}$ frame of image and a feature point that is transformed from a corresponding reference feature point and is in the coordinate system of the $i^{th}$ frame of image, where i is a positive integer ranging from 0 to N.

The second energy function may be:

$$\min_{T_i, g_j} \sum_{i=1}^{N} \sum_{k=1}^{m_i} d(Q(T_i, g_j), P_{ik})^2 + \lambda \sum_{i=1}^{N} \sum_{k=1}^{l_i} d(KQ(T_i, g_r), X_{ik})^2,$$

where $X_{ik}$ is the $k^{th}$ two-dimensional feature point in the $i^{th}$ frame of image, and a reference feature point corresponding to the $k^{th}$ two-dimensional feature point is $g_r$, K is an intrinsic camera parameter matrix that projects a three-dimensional point in the coordinate system to a pixel in the image, $l_i$ is a quantity of two-dimensional feature points in the $i^{th}$ frame of image, $\lambda$ is a weight value, and is used to control impact, on overall energy, of an alignment error of a two-dimensional feature point and a three-dimensional feature point in each frame of image. Other symbols in the second energy function are similar to other symbols in the foregoing second energy function, and details are not described herein.

(3) When in obtained extrinsic camera parameters of N frames of images, a part (for example, a first part) is calculated based on the two-dimensional feature point, and another part (for example, a second part) is calculated based on the three-dimensional feature point, in a second energy function used when bundle adjustment is performed on the N frames of images, extrinsic camera parameters of a first part of frames of images are calculated according to the foregoing first method (i.e. the foregoing steps 201 and 202), and extrinsic camera parameters of a second part of frames of images are calculated according to the foregoing second method (i.e., the foregoing steps 301 and 302). Details are not described herein.

It may be learned that, a partial error is reduced by performing partial bundle adjustment on feature points in each group of many frames (for example, 30 frames) of images using the foregoing three methods. When a correspondence between a feature point in a current frame of image and a reference feature point is established, reference feature points obtained after bundle adjustment is performed on the current N frames of images is first searched for a corresponding reference feature point. When no corresponding reference feature point is found, obtained unoptimized reference feature points in the first N frames of images are searched for a corresponding reference feature point. In this way, an accurate correspondence can be partially established without introducing an accumulated error.

Figure 8:
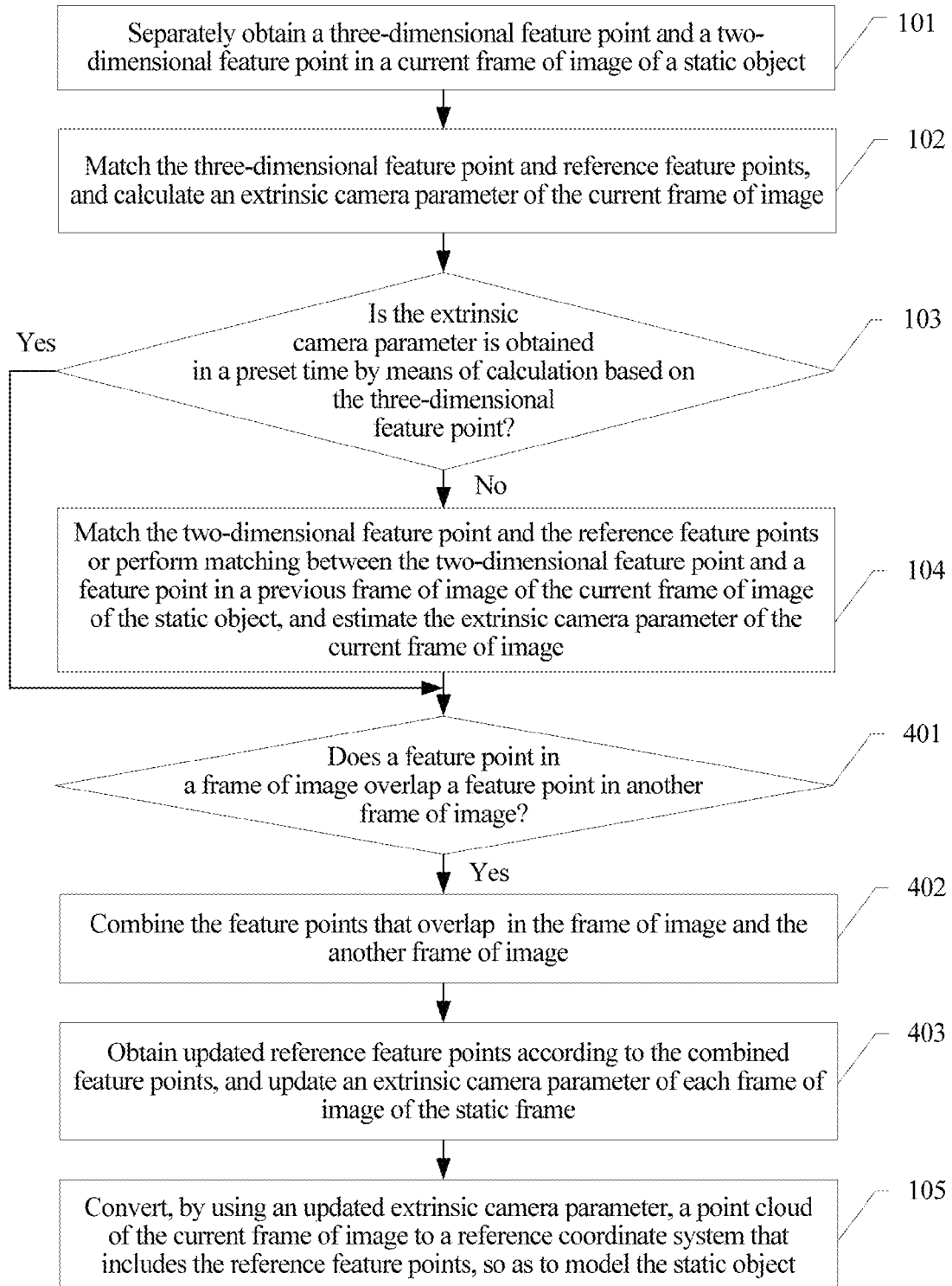
FIG. 8 is a flowchart of another static object reconstruction method according to an embodiment of the present disclosure.

(4) Global optimization: Referring to FIG. 8, after performing processing on multiple frames of images according to the foregoing steps 101 to 104, the static object reconstruction system may perform global optimization according to the following steps 401 to 403, then, when executing step 105, the static object reconstruction system completes transformation of the point cloud according to an extrinsic camera parameter obtained after optimization of the calculated extrinsic camera parameter to perform modeling.

Step 401. Determine whether a feature point in a frame of image of the static object overlaps a feature point in another frame of image, when the two feature points overlap, it indicates that the depth camera returns to an initial photographing location in a process of taking a photo by the depth camera around the static object, and therefore, feature points in two frames of images overlap to form a closed loop, and global optimization needs to be performed, i.e., steps 402 and 403 are executed, or when the two feature points do not overlap, no global optimization is performed.

When it is determined whether the two feature points overlap, a first reference feature point corresponding to the feature point in the frame of image and a second reference feature point corresponding to the feature point in the another frame of image may be separately obtained. When corresponding reference feature points in the second reference feature point can be found for feature points that are in the first reference feature point and whose quantity exceeds a preset value, it is determined that the two feature points overlap, or when corresponding reference feature points in the second reference feature point can be found for feature points that are in the first reference feature point and whose quantity does not exceed a preset value, it may be considered that the two feature points do not overlap. Alternatively, when it is determined whether the two feature points overlap, an extrinsic camera parameter of the frame of image and an extrinsic camera parameter of the another frame of image may be compared, and when the two extrinsic camera parameters are similar, it may be considered that the two feature points overlap.

Step 402. Combine the feature points that overlap in the frame of image and the another frame of image into one feature point, where however, because the reference feature points are formed by accumulation of the feature points in the frames of images, the reference feature points need to be updated herein according to the combined feature points.

Step 403. Update an extrinsic camera parameter of each frame of image of the static object according to the updated reference feature points, where a correspondence between a feature point in each frame of image and the updated reference feature points is first updated, and then the extrinsic camera parameter of each frame of image is updated according to an updated correspondence. In this way, an accumulated error can effectively scatter in a closed loop. For a method for obtaining an extrinsic camera parameter of a frame of image according to a correspondence between a feature point in the frame of image and the reference feature points, refer to the PMCSAC method described in the foregoing embodiment, and details are not described.

Figure 9:
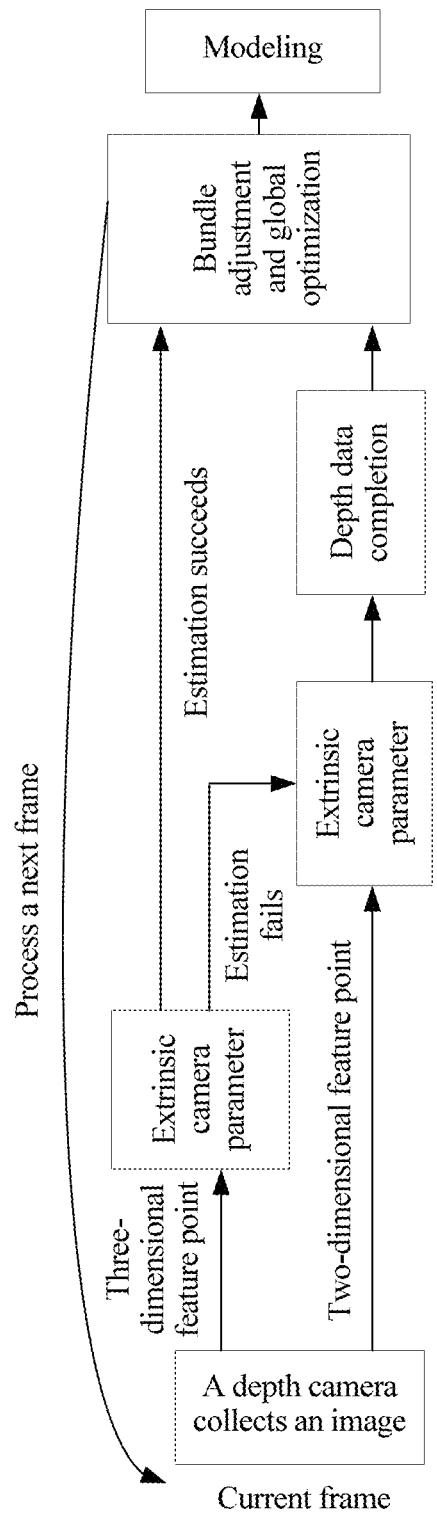
FIG. 9 is a global schematic diagram of static object reconstruction according to an embodiment of the present disclosure.

In conclusion, a static object may be reconstructed by executing steps of extracting a feature point, obtaining an extrinsic camera parameter, optimizing the extrinsic camera parameter, and transforming a point cloud. The steps are shown in FIG. 9 and include the following:

In a static object reconstruction system, a depth camera photographs a static object in various directions around the static object to obtain multiple frames of images. A three-dimensional feature point is extracted for a frame of image, and matching is performed between the three-dimensional feature point and reference feature points (i.e. feature points are aligned) to calculate an extrinsic camera parameter of the current frame of image, when there is no matched reference feature point, a three-dimensional feature point that cannot be matched is added to the reference feature points. When calculating the extrinsic camera parameter based on the three-dimensional feature point fails, a two-dimensional feature point in the current frame of image needs to be extracted, and matching is performed between the two-dimensional feature point and the reference feature points or a feature point in a previous frame of image such that the extrinsic camera parameter of the current frame of image is calculated, and depth data completion can be further performed. After the extrinsic camera parameter of the current frame of image is obtained using the foregoing steps, the extrinsic camera parameter may be optimized, which may include bundle adjustment and global optimization. Then a next frame of image is further processed according to the foregoing steps, and after all frames of images are processed, point clouds of all the frames of images are transformed to a reference coordinate system separately using extrinsic camera parameters of the corresponding frames of images to model the static object, for example, use a Poisson modeling method to reconstruct a three-dimensional model of the static object.

By means of static object reconstruction in this embodiment, the following can be implemented.

When depth data is lost, a problem that a depth data loss cannot be handled in an existing method is effectively resolved, in addition, because in this embodiment of the present disclosure, an image frame in which depth data is lost can be handled, a reconstruction capability is improved. Therefore, the method in this embodiment of the present disclosure may be applied to an overwhelming majority of current active depth collection devices. Because the active depth collection devices all use a light emitting diode (LED) of an infrared band or a laser to avoid impact of a light source on vision, the active depth collection devices are prone to be affected by an outside sunlight, and a depth data loss occurs.

Figure 10:
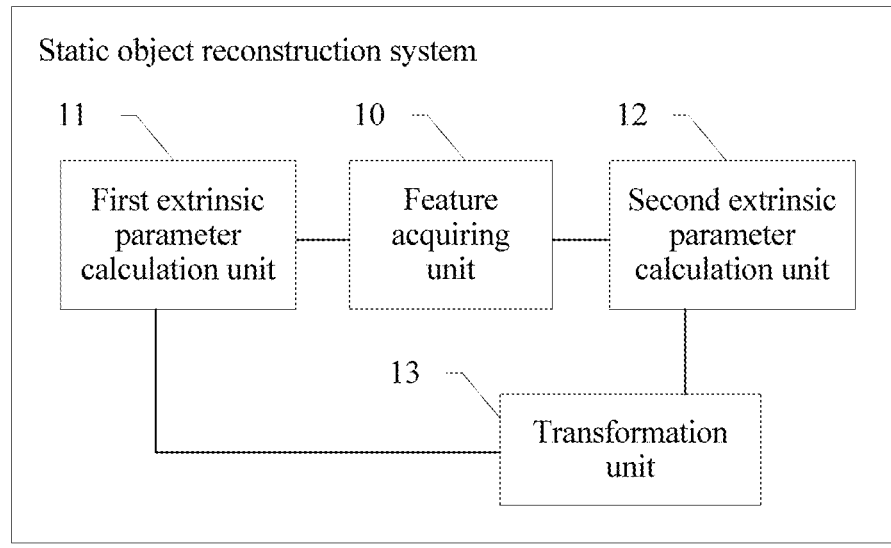
FIG. 10 is a schematic structural diagram of a static object reconstruction system according to an embodiment of the present disclosure.

An embodiment of the present disclosure further provides a static object reconstruction system, a schematic structural diagram of the static object reconstruction system is shown in FIG. 10, and the system includes a feature obtaining unit 10, a first extrinsic parameter calculation unit 11, a second extrinsic parameter calculation unit 12, and a transformation unit 13.

The feature obtaining unit 10 is configured to separately obtain a three-dimensional feature point and a two-dimensional feature point in a current frame of image of a static object. When obtaining feature points, the feature obtaining unit 10 may obtain feature description quantities of the feature points. In an embodiment, for a feature description quantity of the three-dimensional feature point, the feature obtaining unit 10 may separately standardize a two-dimensional feature description quantity and a three-dimensional feature description quantity, i.e., separately calculate standard deviations of the two-dimensional feature description quantity and the three-dimensional feature description quantity in a training set of the two-dimensional feature description quantity and the three-dimensional feature description quantity, and divide a feature description quantity by a corresponding standard deviation to obtain a standardized feature description quantity. Then the feature obtaining unit 10 combines a standardized two-dimensional feature description quantity and a standardized three-dimensional feature description quantity to obtain the feature description quantity of the three-dimensional feature point.

The first extrinsic parameter calculation unit 11 is configured to match the three-dimensional feature point obtained by the feature obtaining unit 10 and reference feature points, and calculate an extrinsic camera parameter of the current frame of image, where the reference feature points are formed by accumulation of feature points in multiple frames of images of the static object.

The first extrinsic parameter calculation unit 11 may compare respective feature description quantities of the three-dimensional feature point and the reference feature points to find reference feature points separately corresponding to all three-dimensional feature points in the current frame of image, and then may calculate the extrinsic camera parameter using the found corresponding reference feature points. When no corresponding reference feature point is found for a three-dimensional feature point, the first extrinsic parameter calculation unit 11 may further add the three-dimensional feature point to the reference feature points.

The second extrinsic parameter calculation unit 12 is configured to, when the first extrinsic parameter calculation unit 11 does not obtain, by means of calculation, the extrinsic camera parameter in a preset time when calculating the extrinsic camera parameter of the current frame of image based on the three-dimensional feature point, match the two-dimensional feature point obtained by the feature obtaining unit 10 and a three-dimensional feature point in the reference feature points or match the two-dimensional feature point obtained by the feature obtaining unit 10 and a two-dimensional feature point in a previous frame of image of the current frame of image of the static object, and calculate the extrinsic camera parameter of the current frame of image.

The second extrinsic parameter calculation unit 12 may align the two-dimensional feature point in the current frame of image with the three-dimensional feature point in the reference feature points, and then calculate the extrinsic camera parameter according to a found corresponding three-dimensional feature point in the reference feature points. Alternatively, the second extrinsic parameter calculation unit 12 may align the two-dimensional feature point in the current frame of image with the two-dimensional feature point in the previous frame of image, then obtain a relative extrinsic camera parameter according to corresponding two-dimensional feature points in the current frame of image and the previous frame of image, and then can obtain the extrinsic camera parameter of the current frame of image with reference to a previously calculated extrinsic camera parameter of the previous frame of image.

The transformation unit 13 is configured to transform, using the extrinsic camera parameter calculated by the first extrinsic parameter calculation unit 11 or the second extrinsic parameter calculation unit 12, a point cloud of the current frame of image to a reference coordinate system that includes the reference feature points to model the static object.

It may be learned that, in the static object reconstruction system in this embodiment, when a first extrinsic parameter calculation unit 11 does not obtain, by means of calculation, an extrinsic camera parameter in a preset time when calculating the extrinsic camera parameter based on a three-dimensional feature point, it indicates that depth data collected by a depth camera is lost or damaged, and a second extrinsic parameter calculation unit 12 uses a two-dimensional feature point to calculate the extrinsic camera parameter such that a transformation unit 13 implements alignment of point clouds of a frame of image according to the extrinsic camera parameter. In this way, a two-dimensional feature point and a three-dimensional feature point are mixed, which can implement that a static object can also be successfully reconstructed when depth data collected by a depth camera is lost or damaged.

Figure 11:
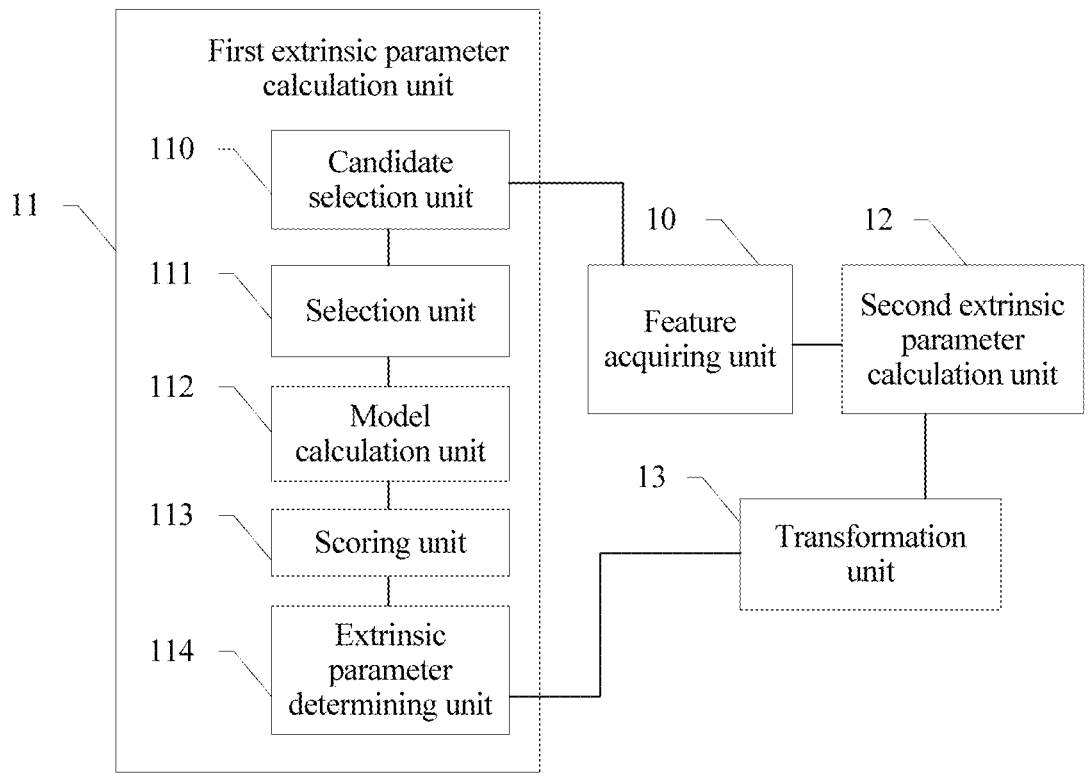
FIG. 11 is a schematic structural diagram of another static object reconstruction system according to an embodiment of the present disclosure.

Referring to FIG. 11, in an embodiment, not only the static object reconstruction system may include the structure shown in FIG. 10, but also the first extrinsic parameter calculation unit 11 in the static object reconstruction system may be implemented using a candidate selection unit 110, a selection unit 111, a model calculation unit 112, a scoring unit 113, and an extrinsic parameter determining unit 114.

The candidate selection unit 110 is configured to select, from the reference feature points, multiple candidate corresponding points at a shortest distance from the three-dimensional feature point in the current frame of image. For a three-dimensional feature point in the current frame of image, the candidate selection unit 110 may calculate Euclidean distances between the three-dimensional feature point and all the reference feature points, sort these Euclidean distances, and select multiple reference feature points at a relatively short Euclidean distance from the three-dimensional feature point as candidate corresponding points.

The selection unit 111 is configured to select, from multiple candidate corresponding points that are selected by the candidate selection unit 110 and are corresponding to each three-dimensional feature point, candidate corresponding points separately corresponding to some three-dimensional feature points in all the three-dimensional feature points in the current frame of image. The selection unit 111 is configured to select the some three-dimensional feature points from all the three-dimensional feature points in the current frame of image according to a probability that feature points in space areas that are in the previous frame of image and that include the static object are in a correct correspondence with reference feature points, and select, from the multiple candidate corresponding points selected by the candidate selection unit 110, a candidate corresponding point of the three-dimensional feature point according to a probability of selecting a candidate corresponding point of the feature point in the previous frame of image.

The model calculation unit 112 is configured to calculate a model parameter according to the candidate corresponding points selected by the selection unit 111 that are separately corresponding to the some three-dimensional feature points.

The scoring unit 113 is configured to perform scoring on a model corresponding to the model parameter calculated by the model calculation unit 112.

The extrinsic parameter determining unit 114 is configured to use, as the extrinsic camera parameter of the current frame of image, a model parameter of a model with a highest score among scores obtained after the selection unit 111, the model calculation unit 112, and the scoring unit 113 cyclically execute the steps of selecting candidate corresponding points, calculating a model parameter, and performing scoring.

The extrinsic parameter determining unit 114 is further configured to: when during the cycling, a probability that the selected some three-dimensional feature points and the selected candidate corresponding points are in an abnormal correspondence is less than a preset value for consecutive $K_s$ times, or a quantity of times of executing the cyclic steps exceeds a preset value, or a time for executing the cyclic steps exceeds a preset value, instruct the selection unit 111, the model calculation unit 112, and the scoring unit 113 to stop executing the cyclic steps of selecting candidate corresponding points, calculating a model parameter, and performing scoring.

In this process, an initial value needs to be set for the extrinsic camera parameter, in this case, when the extrinsic parameter determining unit 114 determines the extrinsic camera parameter of the current frame of image, a score of a model corresponding to the finally determined extrinsic camera parameter needs to be higher than a score of a model corresponding to the initial value of the extrinsic camera parameter.

Further, in this embodiment, when calculating the model parameter, the foregoing model calculation unit 112 obtains the model parameter using the candidate corresponding points corresponding to the some (for example, three) three-dimensional feature points. Therefore, when the model with the highest score is obtained after the scoring model 113 performs scoring, the extrinsic parameter determining 114 may not first use the model parameter of the model as the extrinsic camera parameter, but instead, the candidate selection unit 110 first transforms all the three-dimensional feature points in the current frame of image to the reference coordinate system using the model parameter of the model with the highest score, and obtains corresponding reference feature points by means of calculation. Then the model calculation unit 112 recalculates a model parameter according to all three-dimensional feature points for which correct corresponding feature points can be found in the reference feature points, and then the extrinsic parameter determining unit 114 uses the recalculated model parameter as a final extrinsic camera parameter. When the model parameter is calculated, when in the three-dimensional feature points and the reference feature points, a quantity of correct corresponding points is larger, a model parameter that is finally obtained by means of calculation is more accurate, and the foregoing finally obtained extrinsic camera parameter is also more accurate.

In addition, it should be noted that, the first extrinsic parameter calculation unit 11 may obtain the extrinsic camera parameter of the current frame of image directly using the foregoing units and according to the foregoing steps A1 to A5. In another embodiment, the first extrinsic parameter calculation unit 11 may first calculate an initial extrinsic camera parameter, and then obtain an optimized extrinsic camera parameter according to the foregoing steps A1 to A5.

The first extrinsic parameter calculation unit 11 is further configured to first match the three-dimensional feature point and the feature points in the previous frame of image of the current frame of image of the static object, to obtain the initial extrinsic camera parameter. A method is similar to the method in the foregoing steps A1 to A5, but differs in that the candidate selection unit 110 in the first extrinsic parameter calculation unit 11 needs to select, from the feature points in the previous frame of image, multiple candidate corresponding points at a shortest distance from the three-dimensional feature point in the current frame of image, and then other units perform corresponding processing. Then the first extrinsic parameter calculation unit 11 uses the initial extrinsic camera parameter as a condition of determining the extrinsic camera parameter according to a model score, and matches the three-dimensional feature point and the reference feature points of the static object according to the method in the foregoing steps A1 to A5, to finally obtain the extrinsic camera parameter of the current frame of image. When the extrinsic parameter determining unit 114 determines the extrinsic camera parameter of the current frame of image according to a model score, a score of a model corresponding to the finally determined extrinsic camera parameter needs to be higher than a score of a model corresponding to the initial extrinsic camera parameter.

Figure 12:
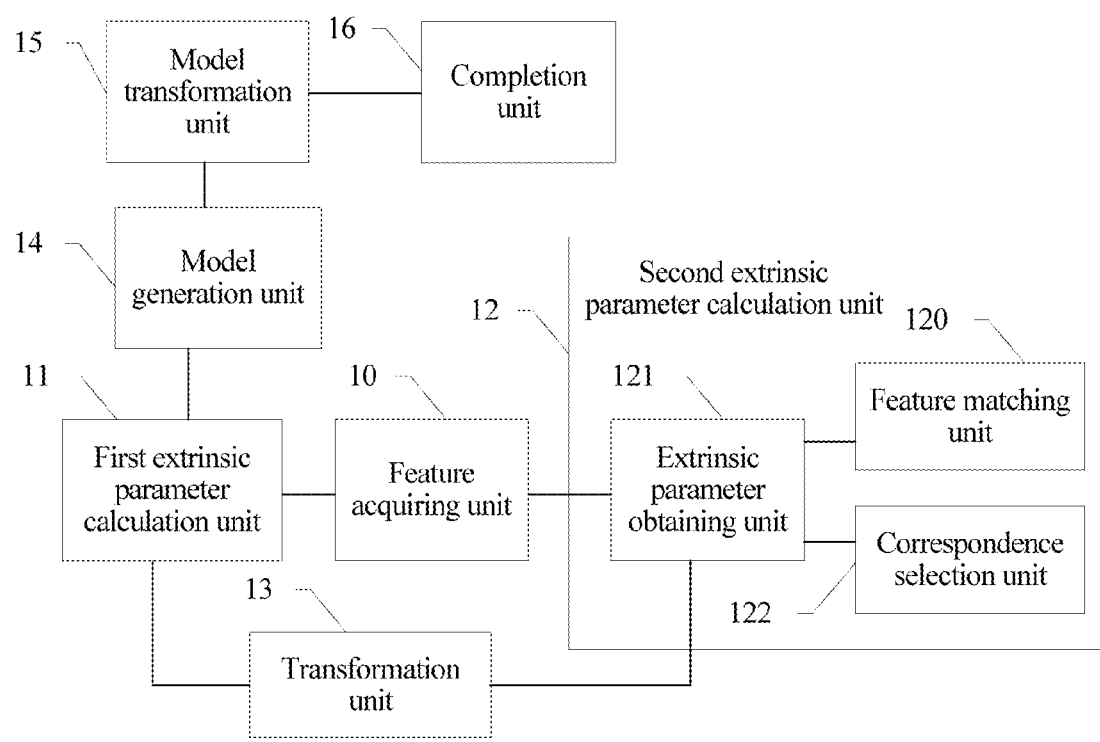
FIG. 12 is a schematic structural diagram of another static object reconstruction system according to an embodiment of the present disclosure.

Referring to FIG. 12, in an embodiment, in addition to the structure shown in FIG. 10, the static object reconstruction system may include a model generation unit 14, a model transformation unit 15, and a completion unit 16, and the second extrinsic parameter calculation unit 12 in the static object reconstruction system may be implemented using a feature matching unit 120 and an extrinsic parameter obtaining unit 121.

The feature matching unit 120 is configured to match the two-dimensional feature point and the three-dimensional feature point in the reference feature points, to determine the three-dimensional reference feature point corresponding to the two-dimensional feature point, and the extrinsic parameter obtaining unit 121 is configured to: determine an extrinsic camera parameter that minimizes a camera pose function in the reference coordinate system, where the camera pose function includes a correspondence between the two-dimensional feature point and the three-dimensional reference feature point, i.e., includes the three-dimensional reference feature point that is determined by the foregoing feature matching unit 120 and is corresponding to the two-dimensional feature point, and use the determined extrinsic camera parameter as the extrinsic camera parameter of the current frame of image.

Further, the second extrinsic parameter calculation unit may include a correspondence selection unit 122, and in this case, the foregoing feature matching unit 120 is further configured to match the two-dimensional feature point and the two-dimensional feature point in the previous frame of image of the current frame of image of the static object, to determine the two-dimensional feature point that is in the previous frame of image and is corresponding to the two-dimensional feature point. The correspondence selection unit 122 is configured to select multiple pairs of corresponding feature points that have depth data at both the two-dimensional feature point in the current frame of image and the feature point that is in the previous frame of image and is corresponding to the two-dimensional feature point. The extrinsic parameter obtaining unit 121 is further configured to: determine the extrinsic camera parameter, relative to the previous frame of image, of the current frame of image according to depth change information of the multiple pairs of corresponding feature points selected by the correspondence selection unit 122, and determine the extrinsic camera parameter of the current frame of image according to the relative extrinsic camera parameter and the extrinsic camera parameter of the previous frame of image.

The model generation unit 14 is configured to, when determining that the first extrinsic parameter calculation unit 11 fails to calculate the extrinsic camera parameter of the current frame of image based on the three-dimensional feature point, generate, according to collected two-dimensional data of the multiple frames of images of the static object, a source model that includes depth data. The target model includes depth data in the current frame of image of the static object, the transformation matrix is a matrix that minimizes a first energy function, the first energy function includes a distance item and a smoothness item, the distance item is used to indicate a distance between a vertex in the source model and a corresponding vertex in the target model, and the smoothness item is used to restrict transformation of adjacent vertices. The model transformation unit 15 is configured to transform, to the target model using the transformation matrix, the source model generated by the model generation unit 14. The completion unit 16 is configured to complete lost depth data in the current frame of image according to the target model obtained after the model transformation unit 15 performs the transformation. In this way, a complete model of the static object can be reconstructed by means of depth data completion, which improves precision of static object reconstruction.

It should be noted that, in the second extrinsic parameter calculation unit 12, a camera pose calculation method based on 2D-3D matching points may be implemented using the feature matching unit 120 and the extrinsic parameter obtaining unit 121, and a camera pose calculation method based on 2D-2D matching points may be implemented using the feature matching unit 120, the extrinsic parameter obtaining unit 121, and the correspondence selection unit 122. In addition, further, the second extrinsic parameter calculation unit 12 may combine the two methods, and may further include an extrinsic parameter selection unit configured to first transform the three-dimensional feature point in the current frame of image to the reference coordinate system by separately using extrinsic camera parameters that are obtained using the two methods, then calculate a probability that a corresponding reference feature point for the three-dimensional feature point in the current frame of image can be found in the reference feature points, where when a distance between a feature point that is transformed from the three-dimensional feature point and is in the reference coordinate system and a nearest reference feature point is less than a preset value, it is considered that the corresponding reference feature point can be found in the reference feature points, and then use an extrinsic camera parameter corresponding to a relatively high probability as a final extrinsic camera parameter of the current frame of image.

Figure 13:
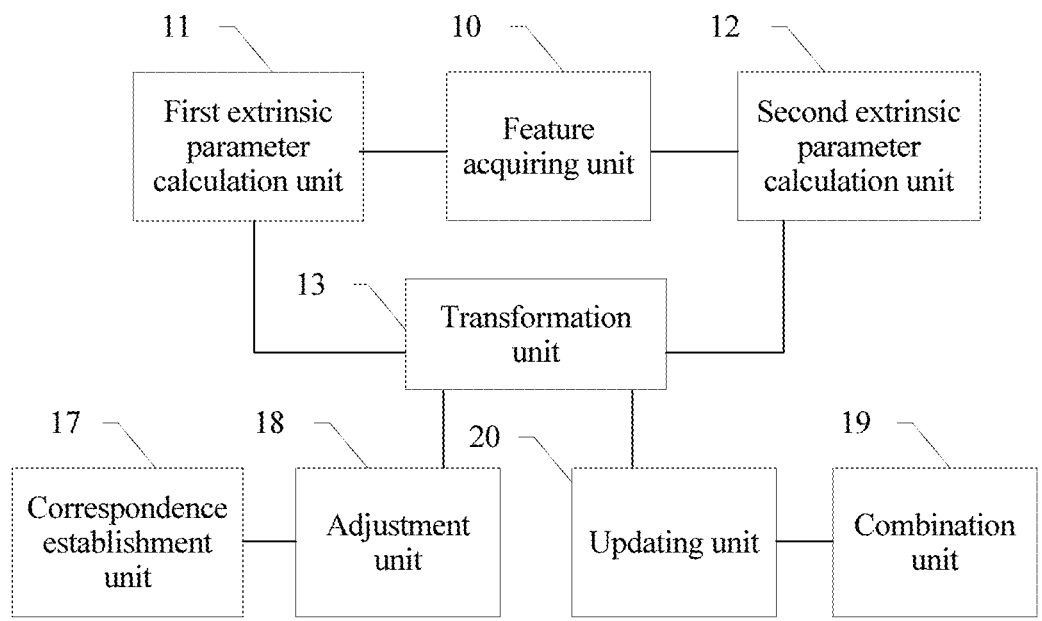
FIG. 13 is a schematic structural diagram of another static object reconstruction system according to an embodiment of the present disclosure.

Referring to FIG. 13, in an embodiment, in addition to the structure shown in FIG. 10, the static object reconstruction system may include a correspondence establishment unit 17, an adjustment unit 18, a combination unit 19, and an updating unit 20.

The correspondence establishment unit 17 is configured to establish a correspondence between the three-dimensional feature point in the current frame of image and the reference feature points using the extrinsic camera parameter. The correspondence establishment unit 17 may first transform the three-dimensional feature point in the current frame of image to the reference coordinate system using the extrinsic camera parameter, then calculate spatial distances between a transformed feature point and all the reference feature points, and find a shortest spatial distance. When the shortest spatial distance is less than a preset value such as 6 mm, a correspondence between a reference feature point corresponding to the shortest spatial distance and a corresponding three-dimensional feature point is established.

The adjustment unit 18 is configured to adjust extrinsic camera parameters of N frames of images of the static object to minimize a second energy function, and in this process, the adjustment unit 18 may further adjust a location of a reference feature point corresponding to each feature point in the N frames of images. The second energy function includes a distance between a three-dimensional feature point in the $i^{th}$ frame of image and a feature point that is transformed from a corresponding reference feature point and is in a coordinate system of the $i^{th}$ frame of image, where i is a positive integer ranging from 0 to N.

In this embodiment, after the first extrinsic parameter calculation unit 11 obtains the extrinsic camera parameter, the correspondence establishment unit 17 may establish the correspondence between the three-dimensional feature point in the current frame of image and the reference feature points. Then, after the first extrinsic parameter calculation unit 11 and the correspondence establishment unit 17 perform corresponding processing on the N frames of images, the adjustment unit 18 may adjust the extrinsic camera parameters of the N frames of images in a bundle adjustment manner. Finally, the transformation unit 13 is configured to transform the point cloud of the current frame of image to the reference coordinate system using an extrinsic camera parameter that is of the current frame of image and is obtained after the adjustment unit 18 adjusts the extrinsic camera parameter calculated by the first extrinsic parameter calculation unit 11.

After the second extrinsic parameter calculation unit 12 obtains the extrinsic camera parameter, the correspondence establishment unit 17 not only needs to establish the correspondence between the three-dimensional feature point and the reference feature points, but also is configured to establish a correspondence between the two-dimensional feature point in the current frame of image and the reference feature points using the extrinsic camera parameter. Then, after the second extrinsic parameter calculation unit 12 and the correspondence establishment unit 17 perform corresponding processing on N frames of images, the adjustment unit 18 may adjust the extrinsic camera parameters of the N frames of images in the bundle adjustment manner, where the used second energy function further includes a distance between a two-dimensional feature point in the $i^{th}$ frame of image and a feature point that is transformed from a corresponding reference feature point and is in the coordinate system of the $i^{th}$ frame of image.

In another case, when in extrinsic camera parameters of N frames of images, a part (for example, a first part) is calculated based on the two-dimensional feature point, and another part (for example, a second part) is calculated based on the three-dimensional feature point, in a second energy function that the foregoing adjustment unit 18 uses when performing bundle adjustment on the N frames of images, extrinsic camera parameters of a first part of frames of images are calculated according to the foregoing first method (i.e. the foregoing steps 201 and 202), and extrinsic camera parameters of a second part of frames of images are calculated according to the foregoing second method (i.e. the foregoing steps 301 and 302). Details are not described herein.

Further, alternatively, in this embodiment, global optimization may be implemented using the combination unit 19 and the updating unit 20, the combination unit 19 is configured to: when a feature point in a frame of image of the static object overlaps a feature point in another frame of image, combine the feature points that overlap in the frame of image and the another frame of image. The updating unit 20 is configured to obtain updated reference feature points according to the feature points combined by the combination unit 19, and update an extrinsic camera parameter of each frame of image of the static object according to the updated reference feature points. In this case, the transformation unit 13 is configured to transform the point cloud of the current frame of image to the reference coordinate system using an extrinsic camera parameter that is of the current frame of image and is obtained by the updating unit 20 by means of updating. When corresponding reference feature points in a second reference feature point corresponding to the feature point in the another frame of image can be found for feature points that are in a first reference feature point corresponding to the feature point in the frame of image and whose quantity exceeds a preset value, it is considered that the two feature points overlap, or an extrinsic camera parameter of the frame of image and an extrinsic camera parameter of the another frame of image are compared, and when the two extrinsic camera parameters are similar, it may be considered that the two feature points overlap.

Figure 14:
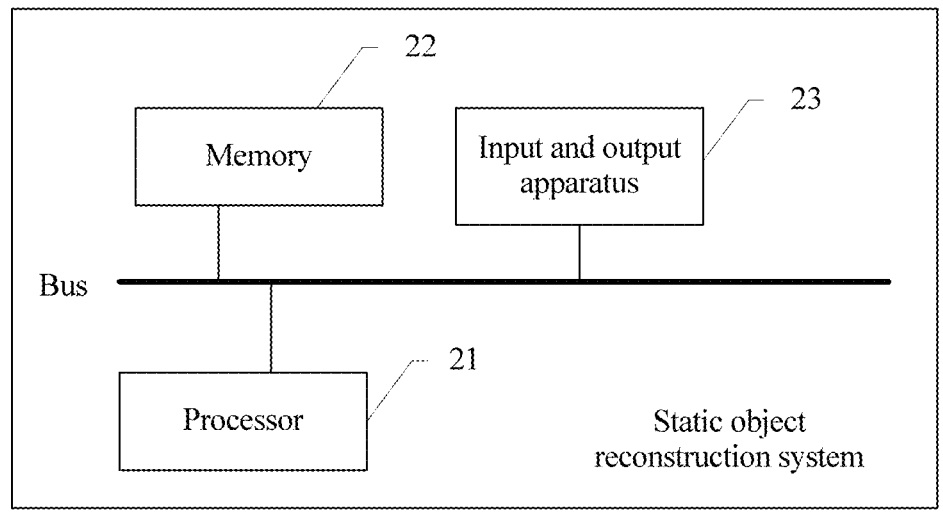
FIG. 14 is a schematic structural diagram of another static object reconstruction system according to an embodiment of the present disclosure.

An embodiment of the present disclosure further provides a static object reconstruction system, a schematic structural diagram of the static object reconstruction system is shown in FIG. 14, and the system includes a memory 22 and a processor 21 that are separately connected to a bus, and may further include an input and output apparatus 23 connected to the bus.

The memory 22 is configured to store data that is input from the input and output apparatus 23, and may further store information such as a necessary file for processing data by the processor 21. The input and output apparatus 23 may include external devices such as a display, a keyboard, a mouse, and a printer, and may further include a port for communication between the static object reconstruction system and another device.

The processor 21 is configured to separately obtain a three-dimensional feature point and a two-dimensional feature point in a current frame of image of a static object, match the obtained three-dimensional feature point and reference feature points, calculate an extrinsic camera parameter of the current frame of image, where the reference feature points are formed by accumulation of feature points in multiple frames of images of the static object, when the processor 21 does not obtain, by means of calculation, the extrinsic camera parameter in a preset time when calculating the extrinsic camera parameter of the current frame of image based on the three-dimensional feature point, match the obtained two-dimensional feature point and a three-dimensional feature point in the reference feature points or match the obtained two-dimensional feature point and a two-dimensional feature point in a previous frame of image of the current frame of image of the static object, calculate the extrinsic camera parameter of the current frame of image, and transform, using the calculated extrinsic camera parameter, a point cloud of the current frame of image to a reference coordinate system that includes the reference feature points to model the static object.

When obtaining feature points, the processor 21 may obtain feature description quantities of the feature points. In an embodiment, for a feature description quantity of the three-dimensional feature point, the processor 21 may separately standardize a two-dimensional feature description quantity and a three-dimensional feature description quantity, i.e., separately calculate standard deviations of the two-dimensional feature description quantity and the three-dimensional feature description quantity in a training set of the two-dimensional feature description quantity and the three-dimensional feature description quantity, and divide a feature description quantity by a corresponding standard deviation to obtain a standardized feature description quantity. Then the processor 21 combines a standardized two-dimensional feature description quantity and a standardized three-dimensional feature description quantity to obtain the feature description quantity of the three-dimensional feature point.

When calculating the extrinsic camera parameter based on the three-dimensional feature point, the processor 21 may compare respective feature description quantities of the three-dimensional feature point and the reference feature points to find reference feature points separately corresponding to all three-dimensional feature points in the current frame of image, and then may calculate the extrinsic camera parameter using the found corresponding reference feature points. When no corresponding reference feature point is found for a three-dimensional feature point, the processor 21 may further add the three-dimensional feature point to the reference feature points.

When calculating the extrinsic camera parameter based on the two-dimensional feature point, the processor 21 may align the two-dimensional feature point in the current frame of image with the three-dimensional feature point in the reference feature points, and then calculate the extrinsic camera parameter according to a found corresponding three-dimensional feature point in the reference feature points. Alternatively, the processor 21 may align the two-dimensional feature point in the current frame of image with the two-dimensional feature point in the previous frame of image, then obtain a relative extrinsic camera parameter according to corresponding two-dimensional feature points in the current frame of image and the previous frame of image, and then can obtain the extrinsic camera parameter of the current frame of image with reference to a previously calculated extrinsic camera parameter of the previous frame of image.

It may be learned that, in the static object reconstruction system in this embodiment, when a processor 21 does not obtain, by means of calculation, an extrinsic camera parameter in a preset time when calculating the extrinsic camera parameter based on a three-dimensional feature point, it indicates that depth data collected by a depth camera is lost or damaged, and the processor 21 uses a two-dimensional feature point to calculate the extrinsic camera parameter to implement alignment of point clouds of a frame of image according to the extrinsic camera parameter. In this way, a two-dimensional feature point and a three-dimensional feature point are mixed, which can implement that a static object can also be successfully reconstructed when depth data collected by a depth camera is lost or damaged.

In an embodiment, when calculating the extrinsic camera parameter based on the three-dimensional feature point, the processor 21 selects, from the reference feature points, multiple candidate corresponding points at a shortest distance from the three-dimensional feature point in the current frame of image, selects, from selected multiple candidate corresponding points corresponding to each three-dimensional feature point, candidate corresponding points separately corresponding to some three-dimensional feature points in all the three-dimensional feature points in the current frame of image, calculates a model parameter according to the selected candidate corresponding points separately corresponding to the some three-dimensional feature points, performs scoring on a model corresponding to the calculated model parameter, uses, as the extrinsic camera parameter of the current frame of image, a model parameter of a model with a highest score among scores obtained after the steps of selecting candidate corresponding points, calculating a model parameter, and performing scoring are cyclically executed. In this process, an initial value needs to be set for the extrinsic camera parameter, in this case, when the processor 21 determines the extrinsic camera parameter of the current frame of image, a score of a model corresponding to the finally determined extrinsic camera parameter needs to be higher than a score of a model corresponding to the initial value of the extrinsic camera parameter. Further, when it is determined that during the cycling, a probability that the selected some three-dimensional feature points and the selected candidate corresponding points are in an abnormal correspondence is less than a preset value for consecutive times, or a quantity of times of executing the cyclic steps exceeds a preset value, or a time for executing the cyclic steps exceeds a preset value, the processor 21 stops executing the cyclic steps of selecting candidate corresponding points, calculating a model parameter, and performing scoring.

When selecting a candidate corresponding point, for a three-dimensional feature point in the current frame of image, the processor 21 may calculate Euclidean distances between the three-dimensional feature point and all the reference feature points, sort these Euclidean distances, and select multiple reference feature points at a relatively short Euclidean distance from the three-dimensional feature point as candidate corresponding points. In addition, when selecting the candidate corresponding points separately corresponding to the some three-dimensional feature points in all the three-dimensional feature points in the current frame of image, the processor 21 is configured to select the some three-dimensional feature points from all the three-dimensional feature points in the current frame of image according to a probability that feature points in space areas that are in the previous frame of image and that include the static object are in a correct correspondence with reference feature points, select, from the selected multiple candidate corresponding points, a candidate corresponding point of the three-dimensional feature point according to a probability of selecting a candidate corresponding point of the feature point in the previous frame of image.

Further, in this embodiment, when calculating the model parameter, the processor 21 obtains the model parameter using the candidate corresponding points corresponding to the some (for example, three) three-dimensional feature points. Therefore, when the model with the highest score is obtained, the processor 21 may not first use the model parameter of the model as the extrinsic camera parameter, but instead, first transform all the three-dimensional feature points in the current frame of image to the reference coordinate system using the model parameter of the model with the highest score, and obtain corresponding reference feature points by means of calculation. Then the processor 21 recalculates a model parameter according to all three-dimensional feature points for which correct corresponding feature points can be found in the reference feature points, and then the processor 21 uses the recalculated model parameter as a final extrinsic camera parameter. When the model parameter is calculated, when in the three-dimensional feature points and the reference feature points, a quantity of correct corresponding points is larger, a model parameter that is finally obtained by means of calculation is more accurate, and the foregoing finally obtained extrinsic camera parameter is also more accurate.

In addition, it should be noted that the processor 21 may obtain the extrinsic camera parameter of the current frame of image directly according to the foregoing steps A1 to A5. In another embodiment, the processor 21 may first calculate an initial extrinsic camera parameter, and then finally obtain the extrinsic camera parameter of the current frame of image according to the foregoing steps A1 to A5.

The processor 21 is further configured to first match the three-dimensional feature point and the feature points in the previous frame of image of the current frame of image of the static object, to obtain the initial extrinsic camera parameter. A method is similar to the method in the foregoing steps A1 to A5, but differs in that the processor 21 needs to select, from the feature points in the previous frame of image, multiple candidate corresponding points at a shortest distance from the three-dimensional feature point in the current frame of image, and then other units perform corresponding processing. Then the processor 21 uses the initial extrinsic camera parameter as a condition of determining the extrinsic camera parameter according to a model score, and matches the three-dimensional feature point and the reference feature points of the static object according to the method in the foregoing steps A1 to A5, to obtain an optimized extrinsic camera parameter of the current frame of image. When the processor 21 determines the extrinsic camera parameter of the current frame of image according to a model score, a score of a model corresponding to the finally determined extrinsic camera parameter needs to be higher than a score of a model corresponding to the initial extrinsic camera parameter.

In another embodiment, when calculating the extrinsic camera parameter based on the two-dimensional feature point, the processor 21 may use a camera pose calculation method that is based on 2D-3D matching points, and is configured to match the two-dimensional feature point and the three-dimensional feature point in the reference feature points, to determine the three-dimensional reference feature point corresponding to the two-dimensional feature point, determine an extrinsic camera parameter that minimizes a camera pose function in the reference coordinate system, where the camera pose function includes a correspondence between the two-dimensional feature point and the three-dimensional reference feature point, and use the determined extrinsic camera parameter as the extrinsic camera parameter of the current frame of image. In another aspect, when calculating the extrinsic camera parameter based on the two-dimensional feature point, the processor 21 may use a camera pose calculation method that is based on 2D-2D matching points. The processor 21 matches the two-dimensional feature point and the two-dimensional feature point in the previous frame of image of the current frame of image of the static object, to determine the two-dimensional feature point that is in the previous frame of image and is corresponding to the two-dimensional feature point, selects multiple pairs of corresponding feature points that have depth data at both the two-dimensional feature point in the current frame of image and the feature point that is in the previous frame of image and is corresponding to the two-dimensional feature point, determines the extrinsic camera parameter, relative to the previous frame of image, of the current frame of image according to depth change information of the selected multiple pairs of corresponding feature points, and determines the extrinsic camera parameter of the current frame of image according to the relative extrinsic camera parameter and the extrinsic camera parameter of the previous frame of image.

In another case, the processor 21 may combine the foregoing two methods for calculating the extrinsic camera parameter based on the two-dimensional feature point, and may be further configured to first transform the three-dimensional feature point in the current frame of image to the reference coordinate system by separately using extrinsic camera parameters obtained using the two methods, then calculate a probability that a corresponding reference feature point for the three-dimensional feature point in the current frame of image can be found in the reference feature points, where when a distance between a feature point that is transformed from the three-dimensional feature point and is in the reference coordinate system and a nearest reference feature point is less than a preset value, it is considered that the corresponding reference feature point can be found in the reference feature points, and then use an extrinsic camera parameter corresponding to a relatively high probability as a final extrinsic camera parameter of the current frame of image.

Further, to reconstruct a complete model of the static object and improve precision of static object reconstruction, the processor 21 is further configured to, when determining that calculating the extrinsic camera parameter of the current frame of image based on the three-dimensional feature point fails, generate, according to collected two-dimensional data of the multiple frames of images of the static object, a source model that includes depth data. The target model includes depth data in the current frame of image of the static object, the transformation matrix is a matrix that minimizes a first energy function, the first energy function includes a distance item and a smoothness item, the distance item is used to indicate a distance between a vertex in the source model and a corresponding vertex in the target model, and the smoothness item is used to restrict transformation of adjacent vertices, transform, to the target model using the transformation matrix, the source model generated by the processor 21, and complete lost depth data in the current frame of image according to the transformed target model.

In another embodiment, the processor 21 may optimize the extrinsic camera parameter in the following manners:

(1) After calculating the extrinsic camera parameter based on the three-dimensional feature point, the processor 21 may establish a correspondence between the three-dimensional feature point in the current frame of image and the reference feature points using the extrinsic camera parameter. After correspondences between three-dimensional feature points and the reference feature points are established for N frames of images, the processor 21 may adjust extrinsic camera parameters of the N frames of images in a bundle adjustment manner, which is adjusting the extrinsic camera parameters of the N frames of images of the static object to minimize a second energy function. In this process, the processor 21 may further adjust a location of a reference feature point corresponding to each feature point in the N frames of images, where the second energy function includes a distance between a three-dimensional feature point in the $i^{th}$ frame of image and a feature point that is transformed from a corresponding reference feature point and is in a coordinate system of the $i^{th}$ frame of image, and i is a positive integer ranging from 0 to N. Finally, the processor 21 is configured to transform the point cloud of the current frame of image to the reference coordinate system using an adjusted extrinsic camera parameter of the current frame of image.

When establishing the correspondence, the processor 21 may first transform the three-dimensional feature point in the current frame of image to the reference coordinate system using the extrinsic camera parameter, then calculate spatial distances between a transformed feature point and all the reference feature points, and find a shortest spatial distance. When the shortest spatial distance is less than a preset value such as 6 mm, a correspondence between a reference feature point corresponding to the shortest spatial distance and a corresponding three-dimensional feature point is established.

(2) After calculating the extrinsic camera parameter based on the two-dimensional feature point, the processor 21 not only needs to establish a correspondence between the three-dimensional feature point and the reference feature points using the extrinsic camera parameter, but also is configured to establish a correspondence between the two-dimensional feature point in the current frame of image and the reference feature points. After correspondences between three-dimensional feature points and the reference feature points and correspondences between two-dimensional feature points and the reference feature points are separately established for N frames of images, the processors 21 may adjust extrinsic camera parameters of the N frames of images in a bundle adjustment manner. A second energy function that the processor 21 uses when adjusting the extrinsic camera parameters further includes a distance between a two-dimensional feature point in the $i^{th}$ frame of image and a feature point that is transformed from a corresponding reference feature point and is in a coordinate system of the $i^{th}$ frame of image.

(3) When in extrinsic camera parameters of N frames of images, a part (for example, a first part) is calculated based on the two-dimensional feature point, and another part (for example, a second part) is calculated based on the three-dimensional feature point, in a second energy function that the processor 21 uses when performing bundle adjustment on the N frames of images, extrinsic camera parameters of a first part of frames of images are calculated according to the foregoing first method (i.e. the foregoing steps 201 and 202), and extrinsic camera parameters of a second part of frames of images are calculated according to the foregoing second method (i.e. the foregoing steps 301 and 302). Details are not described herein.

(4) Global Optimization

The processor 21 may be further configured to, when a feature point in a frame of image of the static object overlaps a feature point in another frame of image, combine the feature points that overlap in the frame of image and the another frame of image, obtain updated reference feature points, then update an extrinsic camera parameter of each frame of image of the static object according to the updated reference feature points. In this case, the processor 21 is configured to transform the point cloud of the current frame of image to the reference coordinate system using an updated extrinsic camera parameter of the current frame of image. When corresponding reference feature points in a second reference feature point corresponding to the feature point in the another frame of image can be found for feature points that are in a first reference feature point corresponding to the feature point in the frame of image and whose quantity exceeds a preset value, it is considered that the two frames of image overlap, or an extrinsic camera parameter of the frame of image and an extrinsic camera parameter of the another frame of image are compared, and when the two extrinsic camera parameters are similar, it may be considered that the two feature points overlap.

A person of ordinary skill in the art may understand that all or some of the steps of the methods in the embodiments may be implemented by a program instructing relevant hardware. The program may be stored in a computer readable storage medium. The storage medium may include: a read-only memory (ROM), a random-access memory (RAM), a magnetic disk, or an optical disc.

The static object reconstruction method and system provided in the embodiments of the present disclosure are described in detail above. The principle and implementation manners of the present disclosure are described herein using examples. The description about the embodiments is merely provided to help understand the method and core ideas of the present disclosure. In addition, a person of ordinary skill in the art can make modifications in terms of the implementation manners and application scopes according to the ideas of the present disclosure. Therefore, the content of this ation shall not be construed as a limitation to the present disclosure.

What is claimed is:

1. A static object reconstruction method, comprising:
obtaining a three-dimensional feature point and a two-dimensional feature point in a current frame of image of a static object;
calculating an extrinsic camera parameter of the current frame of image by matching the three-dimensional feature point and reference feature points, wherein the reference feature points are formed by accumulation of feature points in multiple frames of images of the static object;
when the extrinsic camera parameter is not obtained in a preset time when the extrinsic camera parameter of the current frame of image is calculated based on the three-dimensional feature point, calculating the extrinsic camera parameter of the current frame of image by at least one of matching the two-dimensional feature point and a three-dimensional feature point in the reference feature points and matching the two-dimensional feature point and a two-dimensional feature point in a previous frame of image of the current frame of image of the static object; and
transforming, using the calculated extrinsic camera parameter, a point cloud of the current frame of image to a reference coordinate system that comprises the reference feature points to model the static object.

2. The method according to claim 1, wherein matching the three-dimensional feature point and reference feature points and calculating the extrinsic camera parameter of the current frame of image comprises:
selecting, from the reference feature points, a candidate corresponding point at a shortest distance from the three-dimensional feature point in the current frame of image;
selecting candidate corresponding points separately corresponding to a subset of three-dimensional feature points in all three-dimensional feature points in the current frame of image;
calculating a model parameter according to the candidate corresponding points separately corresponding to the subset of three-dimensional feature points;
performing scoring on a model corresponding to the model parameter;
cyclically executing the steps of selecting candidate corresponding points, calculating the model parameter, and performing scoring until the model parameter of the model with a highest score is computed to be used as the extrinsic camera parameter of the current frame of image; and
stopping executing the cyclic steps of selecting candidate corresponding points, calculating the model parameter, and performing scoring when a probability that the subset of three-dimensional feature points and the candidate corresponding points are in an abnormal correspondence that is less than a preset value for consecutive $K_s$ times, when a quantity of times of executing the cyclic steps exceeds a preset value, or when a time for executing the cyclic steps exceeds a preset value.

3. The method according to claim 2, wherein selecting candidate corresponding points separately corresponding to the subset of three-dimensional feature points in all the three-dimensional feature points in the current frame of image comprises:
selecting the subset of three-dimensional feature points from all the three-dimensional feature points in the current frame of image according to a probability that feature points in space areas that are in the previous frame of image and that comprise the static object are in a correct correspondence with the reference feature points; and
selecting, from the multiple candidate corresponding points, a candidate corresponding point of the three-dimensional feature point according to a probability of selecting a candidate corresponding point of the feature point in the previous frame of image.

4. The method according to claim 2, wherein before matching the three-dimensional feature point and reference feature points, the method further comprises:
matching the three-dimensional feature point and the feature points in the previous frame of image of the current frame of image of the static object to obtain an initial extrinsic camera parameter;
using the initial extrinsic camera parameter as a condition in determining the extrinsic camera parameter according to a model score; and
matching the three-dimensional feature point and the reference feature points of the static object to obtain the extrinsic camera parameter of the current frame of image.

5. The method according to claim 1, wherein matching the two-dimensional feature point and the three-dimensional feature point in the reference feature points comprises:
matching the two-dimensional feature point and the three-dimensional feature point in the reference feature points to determine a three-dimensional reference feature point corresponding to the two-dimensional feature point; and
using the a second extrinsic camera parameter as the extrinsic camera parameter of the current frame of image, wherein the second extrinsic camera parameter minimizes a camera pose function in the reference coordinate system, and wherein the camera pose function comprises a correspondence between the two-dimensional feature point and the three-dimensional reference feature point.

6. The method according to claim 1, wherein matching the two-dimensional feature point and the two-dimensional feature point in the previous frame of image of the current frame of image of the static object comprises:
matching the two-dimensional feature point and the two-dimensional feature point in the previous frame of image of the current frame of image of the static object to determine the two-dimensional feature point that is in the previous frame of image and is corresponding to the two-dimensional feature point; and
selecting multiple pairs of corresponding feature points that have depth data at both the two-dimensional feature point in the current frame of image and the two-dimensional feature point that is in the previous frame of image and is corresponding to the two-dimensional feature point.

7. The method according to claim 1, wherein when the extrinsic camera parameter is not obtained in the preset time and when the extrinsic camera parameter of the current frame of image is calculated based on the three-dimensional feature point, the method further comprises:
generating, according to collected two-dimensional data of the multiple frames of images of the static object, a source model that comprises depth data;
transforming the source model to a target model using a transformation matrix; and
completing lost depth data in the current frame of image according to the transformed target model, wherein the target model comprises depth data in the current frame of image of the static object, wherein the transformation matrix is a matrix that minimizes a first energy function, wherein the first energy function comprises a distance item and a smoothness item, wherein the distance item is used to indicate a distance between a vertex in the source model and a corresponding vertex in the target model, and wherein the smoothness item is used to restrict transformation of adjacent vertices.

8. The method according to claim 1, wherein after calculating the extrinsic camera parameter of the current frame of image, the method further comprises:
establishing a correspondence between the three-dimensional feature point in the current frame of image and the reference feature points using the extrinsic camera parameter;
adjusting extrinsic camera parameters of N frames of images of the static object to minimize a second energy function, wherein the second energy function comprises a distance between a three-dimensional feature point in an $i^{th}$ frame of image and a feature point that is transformed from a corresponding reference feature point and is in a coordinate system of the $i^{th}$ frame of image, and wherein i is a positive integer ranging from 0 to N; and
transforming, using the calculated extrinsic camera parameter the point cloud of the current frame of image to the reference coordinate system using an extrinsic camera parameter obtained after the adjustment is performed on the calculated extrinsic camera parameter.

9. The method according to claim 8, wherein when the extrinsic camera parameter is calculated based on the two-dimensional feature point and after the calculating the extrinsic camera parameter of the current frame of image, the method further comprises establishing a correspondence between the two-dimensional feature point in the current frame of image and the reference feature points using the extrinsic camera parameter, wherein the second energy function further comprises a distance between a two-dimensional feature point in the $i^{th}$ frame of image and a feature point that is transformed from a corresponding reference feature point and that is in the coordinate system of the $i^{th}$ frame of image.

10. The method according to claim 1, wherein after calculating the extrinsic camera parameter of the current frame of image, the method further comprises:
combining the feature points that overlap in the frame of image and the another frame of image when a feature point in a frame of image of the static object overlaps a feature point in another frame of image to obtain updated reference feature points;
updating an extrinsic camera parameter of each frame of image of the static object according to the updated reference feature points; and
transforming, using the calculated extrinsic camera parameter, the point cloud of the current frame of image to the reference coordinate system using an extrinsic camera parameter obtained after the updating is performed on the calculated extrinsic camera parameter.

11. A static object reconstruction system, comprising:
a processor; and
a non-transitory computer-readable storage medium coupled to the processor and storing programming instructions for execution by the processor,
wherein the programming instructions instruct the processor to:

obtain a three-dimensional feature point and a two-dimensional feature point in a current frame of image of a static object;
calculate an extrinsic camera parameter of the current frame of image by matching the three-dimensional feature point and reference feature points, wherein the reference feature points are formed by accumulation of feature points in multiple frames of images of the static object;
when does not obtain, by means of calculation, the extrinsic camera parameter in a preset time when calculating the extrinsic camera parameter of the current frame of image based on the three-dimensional feature point, calculate the extrinsic camera parameter of the current frame of image by at least one of matching the two-dimensional feature point and a three-dimensional feature point in the reference feature points and matching the two-dimensional feature point and a two-dimensional feature point in a previous frame of image of the current frame of image of the static object; and
transform, using the extrinsic camera parameter, a point cloud of the current frame of image to a reference coordinate system that comprises the reference feature points to model the static object.

12. The system according to claim 11, wherein the programming instructions instruct the processor to:
select, from the reference feature points, a candidate corresponding point at a shortest distance from the three-dimensional feature point in the current frame of image;
select candidate corresponding points separately corresponding to a subset three-dimensional feature points in all three-dimensional feature points in the current frame of image;
calculate a model parameter according to the candidate corresponding points that are separately corresponding to the subset of three-dimensional feature points;
perform scoring on a model corresponding to the model parameter; and
use a model parameter of a model with a highest score among scores as the extrinsic camera parameter of the current frame of image in response to cyclically executing the steps of selecting candidate corresponding points, calculating the model parameter, and performing scoring until the model with the highest score is computed; and
stop executing the cyclic steps of selecting candidate corresponding points, calculating the model parameter, and performing scoring when a probability that the subset of three-dimensional feature points and the candidate corresponding points are in an abnormal correspondence is less than a preset value for consecutive times, when a quantity of times of executing the cyclic steps exceeds a preset value, or when a time for executing the cyclic steps exceeds a preset value.

13. The system according to claim 12, wherein the programming instructions instruct the processor to:
select the subset of three-dimensional feature points from all the three-dimensional feature points in the current frame of image according to a probability that feature points in space areas that are in the previous frame of image and that comprise the static object are in a correct correspondence with the reference feature points; and
select, from the multiple candidate corresponding points, a candidate corresponding point of the three-dimensional feature point according to a probability of selecting a candidate corresponding point of the feature point in the previous frame of image.

14. The system according to claim 12, wherein the programming instructions instruct the processor to:
match the three-dimensional feature point and the feature points in the previous frame of image of the current frame of image of the static object to obtain an initial extrinsic camera parameter;
use the initial extrinsic camera parameter as a condition of determining the extrinsic camera parameter according to a model score; and
match the three-dimensional feature point and the reference feature points of the static object to finally obtain the extrinsic camera parameter of the current frame of image.

15. The system according to claim 11, wherein the programming instructions instruct the processor to:
match the two-dimensional feature point and the three-dimensional feature point in the reference feature points to determine a three-dimensional reference feature point corresponding to the two-dimensional feature point;
use determined second extrinsic camera parameter as the extrinsic camera parameter of the current frame of image, wherein the second extrinsic camera parameter minimizes a camera pose function in the reference coordinate system, and wherein the camera pose function comprises a correspondence between the two-dimensional feature point and the three-dimensional reference feature point.

16. The system according to claim 15, wherein the programming instructions instruct the processor to:
match the two-dimensional feature point and the two-dimensional feature point in the previous frame of image of the current frame of image of the static object to determine the two-dimensional feature point that is in the previous frame of image and is corresponding to the two-dimensional feature point; and
select multiple pairs of corresponding feature points that have depth data at both the two-dimensional feature point in the current frame of image and the feature point that is in the previous frame of image and is corresponding to the two-dimensional feature point.

17. The system according to claim 11, wherein the programming instructions further instruct the processor to:
generate, according to collected two-dimensional data of the multiple frames of images of the static object, a source model that comprises depth data when determining that calculating the extrinsic camera parameter of the current frame of image based on the three-dimensional feature point fails, wherein the target model comprises depth data in the current frame of image of the static object, wherein the transformation matrix is a matrix that minimizes a first energy function, wherein the first energy function comprises a distance item and a smoothness item, wherein the distance item is used to indicate a distance between a vertex in the source model and a corresponding vertex in the target model, and wherein the smoothness item is used to restrict transformation of adjacent vertices;
transform, to the target model using the transformation matrix, the source model; and
complete lost depth data in the current frame of image according to the target model.

18. The system according to claim 11, wherein the programming instructions further instruct the processor to:
establish a correspondence between the three-dimensional feature point in the current frame of image and the reference feature points using the extrinsic camera parameter;
adjust extrinsic camera parameters of N frames of images of the static object to minimize a second energy function, wherein the second energy function comprises a distance between a three-dimensional feature point in the $i^{th}$ frame of image and a feature point that is transformed from a corresponding reference feature point and is in a coordinate system of the $i^{th}$ frame of image, and wherein i is a positive integer ranging from 0 to N; and
transform the point cloud of the current frame of image to the reference coordinate system using an extrinsic camera parameter that is of the current frame of image.

19. The system according to claim 18, wherein the programming instructions instruct the processor to establish a correspondence between the two-dimensional feature point in the current frame of image and the reference feature points using the extrinsic camera parameter when the extrinsic camera parameter is calculated based on the two-dimensional feature point, wherein the second energy function that is used when adjusting the extrinsic camera parameter further comprises a distance between a two-dimensional feature point in the $i^{th}$ frame of image and a feature point that is transformed from a corresponding reference feature point and that is in the coordinate system of the $i^{th}$ frame of image.

20. The system according to claim 11, wherein the programming instructions further instruct the processor to:
combine the feature points that overlap in the frame of image and the another frame of image when a feature point in a frame of image of the static object overlaps a feature point in another frame of image;
obtain updated reference feature points according to the feature points;
update an extrinsic camera parameter of each frame of image of the static object according to the updated reference feature points; and
transform the point cloud of the current frame of image to the reference coordinate system using an extrinsic camera parameter that is of the current frame of image and is obtained by means of updating.

* * * * *

UNITED STATES PATENT AND TRADEMARK OFFICE
CERTIFICATE OF CORRECTION

PATENT NO. : 9,830,701 B2
APPLICATION NO. : 15/232229
DATED : November 28, 2017
INVENTOR(S) : Guofeng Zhang et al.

Page 1 of 1

It is certified that error appears in the above-identified patent and that said Letters Patent is hereby corrected as shown below:

In the Claims

Column 40, Lines 26-56, Claim 12 should read:
12. The system according to claim 11, wherein the programming instructions instruct the processor to:
    select, from the reference feature points, a candidate corresponding point at a shortest distance from the three-dimensional feature point in the current frame of image;
    select candidate corresponding points separately corresponding to a subset three-dimensional feature points in all three-dimensional feature points in the current frame of image;
    calculate a model parameter according to the candidate corresponding points that are separately corresponding to the subset of three-dimensional feature points;
    perform scoring on a model corresponding to the model parameter; and
    use a model parameter of a model with a highest score among scores as the extrinsic camera parameter of the current frame of image in response to cyclically executing the steps of selecting candidate corresponding points, calculating the model parameter, and performing scoring until the model with the highest score is computed; and
    stop executing the cyclic steps of selecting candidate corresponding points, calculating the model parameter, and performing scoring when a probability that the subset of three-dimensional feature points and the candidate corresponding points are in an abnormal correspondence is less than a preset value for consecutive $K_s$ times, when a quantity of times of executing the cyclic steps exceeds a preset value, or when a time for executing the cyclic steps exceeds a preset value.

Signed and Sealed this
Third Day of July, 2018

Andrei Iancu
*Director of the United States Patent and Trademark Office*